United States Patent
Okada et al.

(10) Patent No.: US 9,887,772 B2
(45) Date of Patent: Feb. 6, 2018

(54) TRANSMISSION DEVICE, TRANSMISSION NETWORK SYSTEM, AND PATH DELAY MEASURING METHOD

(71) Applicant: Fujitsu Limited, Kawasaki-shi, Kanagawa (JP)

(72) Inventors: Naoya Okada, Yokohama (JP); Yasuyuki Mitsumori, Kawasaki (JP); Ryuichi Moriya, Kawasaki (JP); Tsuyoshi Ohigawa, Kawasaki (JP); Kenichi Yajima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/922,456

(22) Filed: Oct. 26, 2015

(65) Prior Publication Data
US 2016/0156411 A1 Jun. 2, 2016

(30) Foreign Application Priority Data
Dec. 1, 2014 (JP) .................................. 2014-243089

(51) Int. Cl.
H04B 10/079 (2013.01)
H04J 3/16 (2006.01)
H04L 12/26 (2006.01)

(52) U.S. Cl.
CPC ........ *H04B 10/0795* (2013.01); *H04J 3/1652* (2013.01); *H04L 43/0864* (2013.01)

(58) Field of Classification Search
CPC ................................................ H04B 10/0795
See application file for complete search history.

(56) References Cited

U.S. PATENT DOCUMENTS

| 6,665,315 B1* | 12/2003 | Karasawa ............. H04J 3/0682 370/508 |
| 2010/0209106 A1* | 8/2010 | Sugawara ............ H04B 10/275 398/59 |
| 2017/0155593 A1* | 6/2017 | Hirata ..................... H04L 47/28 |

FOREIGN PATENT DOCUMENTS

| JP | 2000-332715 | 11/2000 |
| JP | 2006-13642 | 1/2006 |

OTHER PUBLICATIONS

Manual Pages of Oracle System, Oracle, 2013, pp. 1706-1709.*
RFC-1122, Requirements for Internet Hosts—Communication Layers, IETF, Oct. 1989.*
RFC-791, Internet Protocol,IETF, Sep. 1981.*

* cited by examiner

*Primary Examiner* — Shi K Li
(74) *Attorney, Agent, or Firm* — Staas & Halsey LLP

(57) ABSTRACT

A transmission device includes: a code generator configured to generate delay measurement information; an insertion unit configured to sequentially insert the delay measurement information generated by the code generator, in each of delay measurement signals in a plurality of frames, and to sequentially transmit the plurality of frames sequentially inserted with the delay measurement information to a counterpart device on a transmission path whose path delay time is to be measured; and a detector configured to receive a plurality of frames transmitted from the counterpart device and to detect the delay measurement information included in each of delay measurement signals in the plurality of received frames.

20 Claims, 13 Drawing Sheets

FIG. 1
RELATED ART

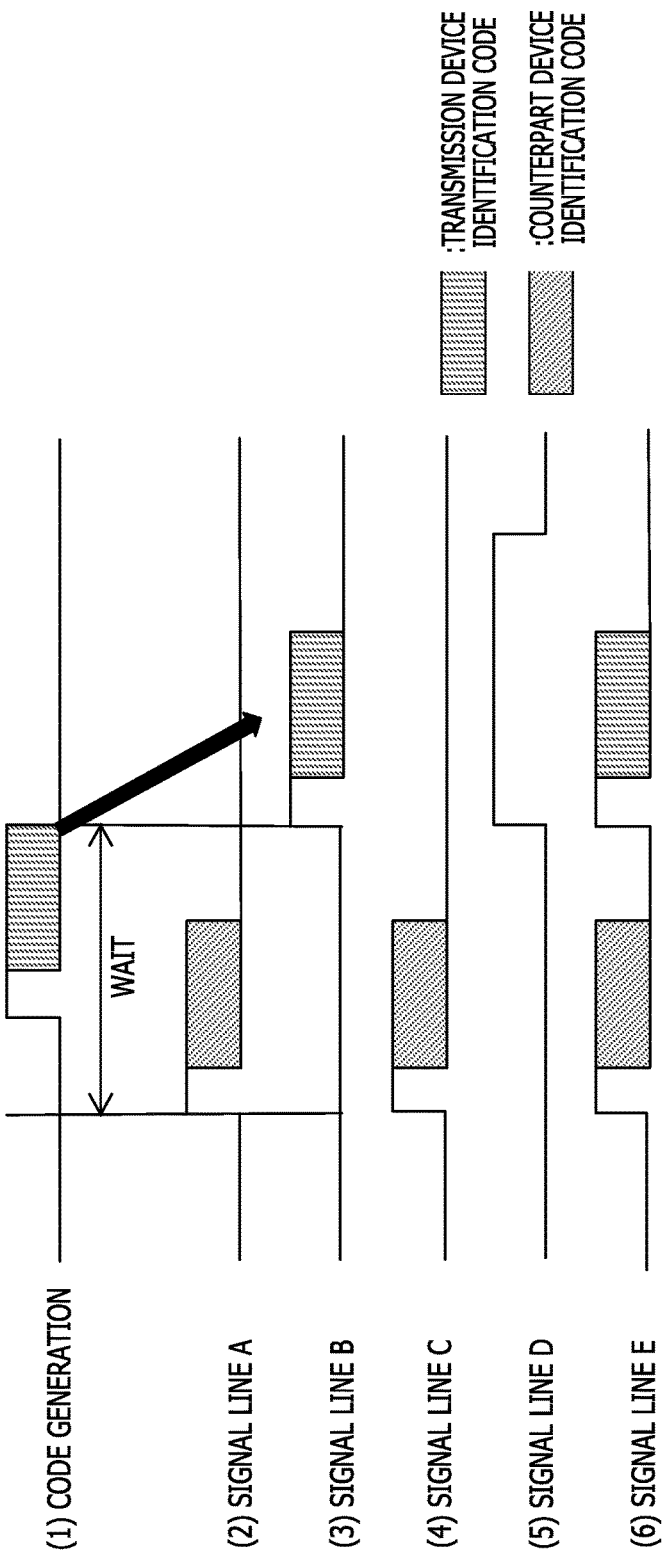

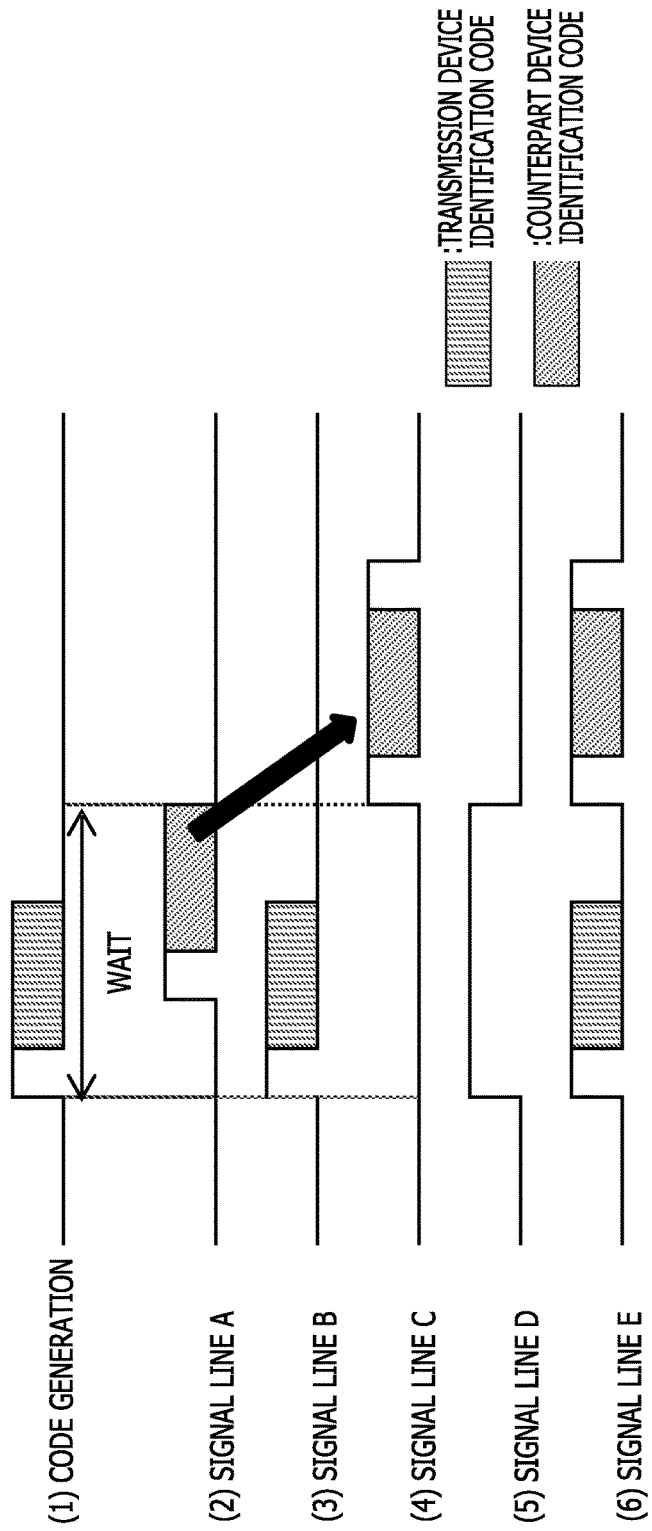

TRANSMISSION DEVICE, TRANSMISSION NETWORK SYSTEM, AND PATH DELAY MEASURING METHOD

CROSS-REFERENCE TO RELATED APPLICATION

This application is based upon and claims the benefit of priority from the prior Japanese Patent Application No. 2014-243089 filed on Dec. 1, 2014, the entire contents of which are incorporated herein by reference.

FIELD

The embodiments discussed herein are related to a transmission device, a transmission network system, and a path delay measuring method.

BACKGROUND

As an example of a communication protocol related to an optical communication backbone network which transmits mass information over a long distance, an Optical Transport Network (OTN) is known which is defined in the International Telecommunication Union Telecommunication Standardization Sector (ITU-T) G.709. In the OTN, a client signal conforming to specific communication standards such as, for example, the Synchronous Optical Network (SONET)/Synchronous Digital Hierarchy (SDH), and Ethernet® is arranged in a frame having a fixed length and is transmitted on a network by using a wavelength division multiplexing technology. In a network conforming to the OTN, a transmission path is not fixed, differently from a network conforming to the SONET/SDH, and may be changed during operation of the network by, for example, extension of a transmission device. The transmission path is selected and switched to provide an optimal transmission quality of the transmission path in the network.

Path delay time is one of factors indicating the quality of the transmission path. The path delay time is measured, for example, in a steady manner. In addition, there is a recent case where a communication carrier and a contractor sign a "Service Level Agreement" according to which the communication carrier explicitly guarantees the contractor for the quality of service. In this case, it may be important for the communication carrier to measure the path delay time for management of network quality. For example, if different transmission devices facing with each other on the transmission path are managed by different communication carriers, each of the different communication carriers measures the path delay time through the transmission device managed by the corresponding communication carrier and performs a maintenance and management of the network.

In the OTN, a Delay Measurement (DM) function is defined in order to measure the path delay time in an Optical Data Unit (ODU) Path Monitoring (PM) layer and the path delay time in a Tandem Connection Monitoring (TCM) layer. FIG. 1 is a view illustrating the configuration of an ODU overhead defined in ITU-TG.709. FIG. 2 is a view illustrating the configuration of a PM overhead defined in ITU-TG.709. FIG. 3 is a view illustrating the configuration of a TCM overhead defined in ITU-TG.709.

As illustrated in FIG. 1, in an OTN, a PM overhead for monitoring a defect to a path between any transmission devices in a network or monitoring the line quality of the path is defined in the tenth to twelfth columns at the third row in an ODU overhead of an OTN frame. In addition, as illustrated in FIGS. 1 and 2, a one bit path delay measurement (DMp) signal indicating the start of delay measurement test for the path is defined in a bit 7 in a PM and TCM field in the third column at the second row. In addition, as illustrated in FIG. 1, TCM overheads (TCM1 to TCM6) for monitoring a defect to a maximum of six TCM sections randomly set on a path or the line quality of the path are defined in the fifth to thirteenth columns at the second row and first to ninth columns at the third row in the ODU overhead. In addition, as illustrated in FIGS. 1 and 2, six one-bit TCM delay measurement (DMti) signals indicating the start of delay measurement test for the six TCM sections are defined in bits 1 to 6 in the PM and TCM field.

The measurement of path delay time in the OTN is performed when a change in the above-described one-bit DM signals (DMp signal and DMti signal) is detected. Specifically, a transmission device configured to measure the path delay time inverts a DM signal in an OTN frame from a current value at the start of measurement. Then, the transmission device transmits the OTN frame including the DM signal having the inverted value to a counterpart device (e.g., a counterpart transmission device) on a transmission path to be measured. In this manner, the value of the DM signal is inverted from 0 to 1 or from 1 to 0 at the start of measurement. The inverted value of the DM signal is held until the start of the next delay measurement test. The OTN frame including the DM signal having the inverted value is received by the counterpart device via the transmission path to be measured and is returned from the counterpart device to the transmission device via the transmission path to be measured. When the DM signal having the inverted value is detected from the frame returned from the counterpart device, the transmission device terminates the measurement of path delay time. Thus, time from a point of time when the value of the DM signal is inverted to a point of time when the DM signal having the inverted value is detected is measured as the path delay time for the transmission path to be measured.

In addition, the following hitless switching system has been known. Specifically, in a device arranged opposite to a termination device (counterpart station), pseudo error information is inserted in a B2 byte of a SDH frame signal in a B2 error insertion unit, and is transmitted to the counterpart station via working and protection transmission paths. In the counterpart station, the number of errors is calculated from the B2 byte information, inserted in a M1 byte, and returned to the device via the working and protection transmission paths. In the device, a path length difference between the working and protection transmission paths is detected using a detection phase difference of the number of M1 byte errors and setting control of delay amount of working and protection transceivers is performed by a phase controller.

In addition, the following SDN transmission node-to-node distance measuring system has been known. Specifically, a measuring unit and a loop-back unit are included in the SDN transmission node-to-node distance measuring system to measure a node-to-node distance. The measuring unit starts measurement of frame round-trip time when a frame having start data inserted in a specific byte of a frame overhead is transmitted. The loop-back unit starts measurement of delay time when the start data are detected from the specific byte of the frame overhead received from the measuring unit, and stops the measurement of delay time when a specific byte of the frame overhead transmitted to the measuring unit is detected. The loop-back unit inserts the measured delay time data in the detected specific byte and returns the specific byte to the measuring unit. The measuring unit stops the measurement of round-trip time when the delay time is separated from the specific byte of the frame overhead received from the loop-back unit, and corrects the round-trip time by subtracting the separated delay time from the measured round-trip time.

Related technologies are disclosed in, for example, Japanese Laid-Open Patent Publication No. 2006-13642, and Japanese Laid-Open Patent Publication No. 2000-332715.

SUMMARY

According to an aspect of the invention, a transmission device includes: a code generator configured to generate delay measurement information; an insertion unit configured to sequentially insert the delay measurement information generated by the code generator, in each of delay measurement signals in a plurality of frames, and to sequentially transmit the plurality of frames sequentially inserted with the delay measurement information to a counterpart device on a transmission path whose path delay time is to be measured; and a detector configured to receive a plurality of frames transmitted from the counterpart device and to detect the delay measurement information included in each of delay measurement signals in the plurality of received frames.

The object and advantages of the present disclosure will be realized and attained by means of the elements and combinations particularly pointed out in the claims.

It is to be understood that both the foregoing general description and the following detailed description are exemplary and explanatory and are not restrictive of the present disclosure, as claimed.

BRIEF DESCRIPTION OF DRAWINGS

Figure 1:
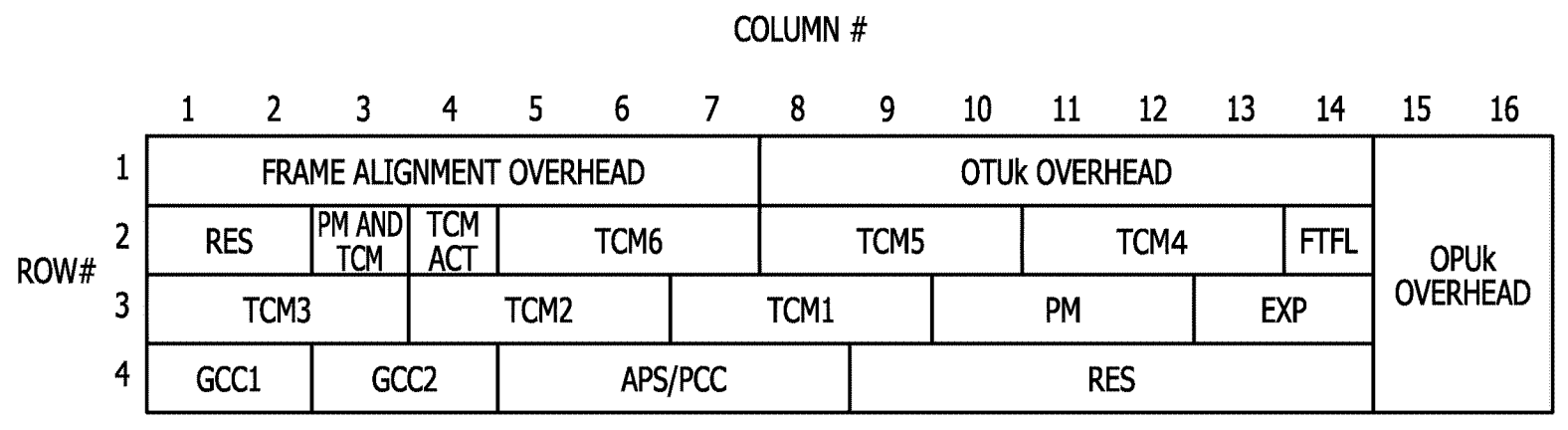

FIG. 1 is a view illustrating the configuration of an ODU overhead defined in ITU-TG.709;

FIG. 9 is a view illustrating a first example for explaining a timing at which delay measurement information of a transmission device and a counterpart device is inserted in a delay measurement signal;

FIG. 10 is a view illustrating a second example for explaining a timing at which delay measurement information of a transmission device and a counterpart device is inserted in a delay measurement signal;

DESCRIPTION OF EMBODIMENTS

Hereinafter, modes for carrying out the techniques for a transmission device to exchange information, which is used by the transmission device to autonomously measure path delay time for a transmission path, with a counterpart device by using a delay measurement signal defined in a specific communication standard will be described with reference to the drawings.

Figure 2:
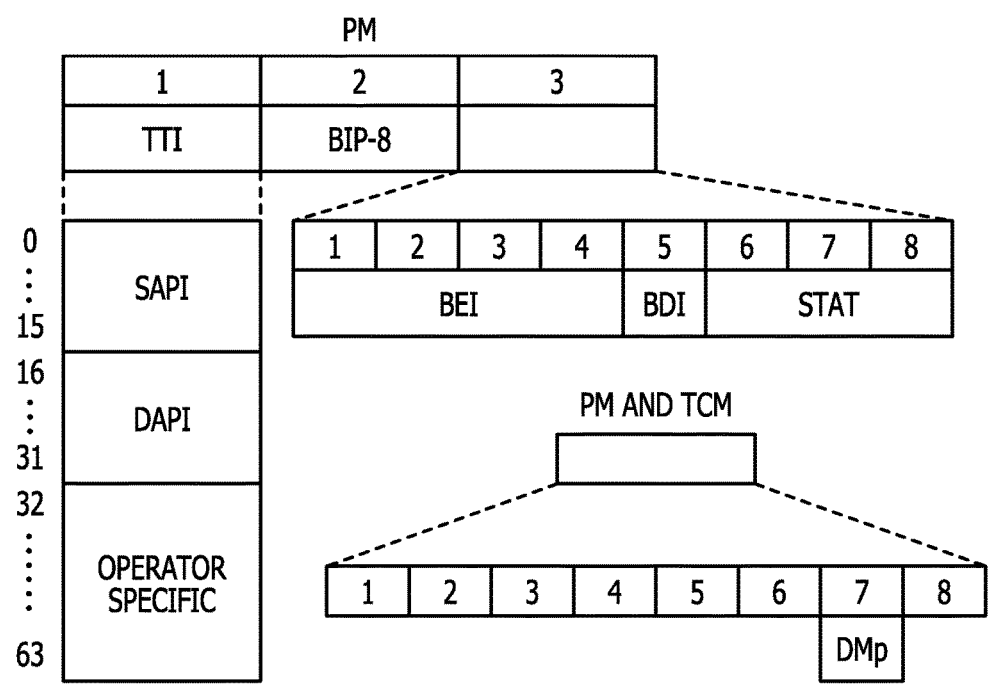
FIG. 2 is a view illustrating the configuration of a PM overhead defined in ITU-TG.709.
Figure 3:
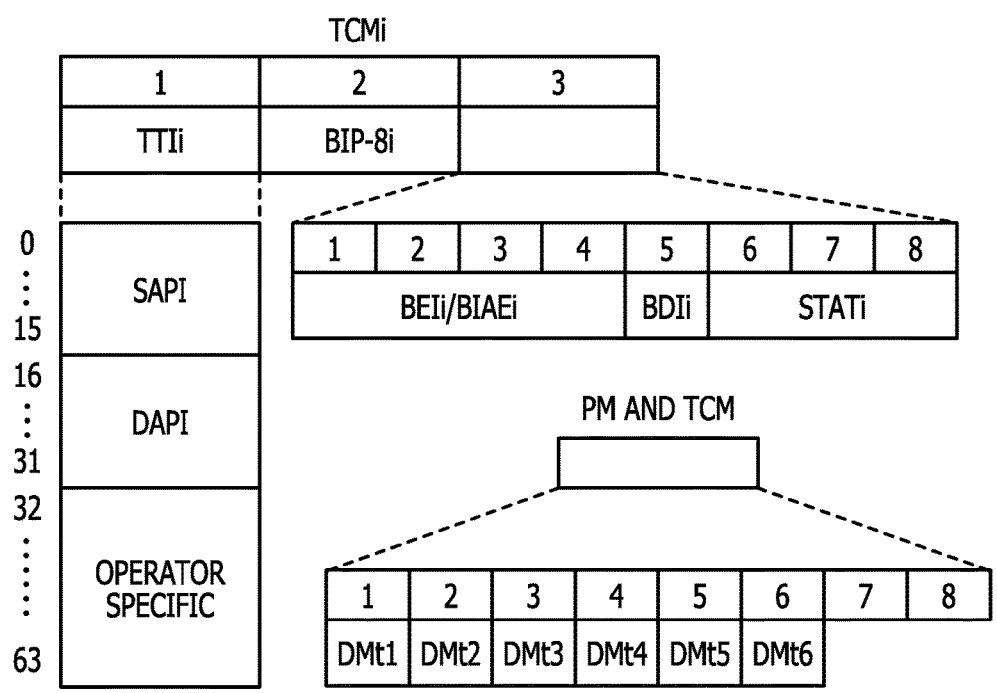
FIG. 3 is a view illustrating the configuration of a TCM overhead defined in ITU-TG.709.
Figure 4:
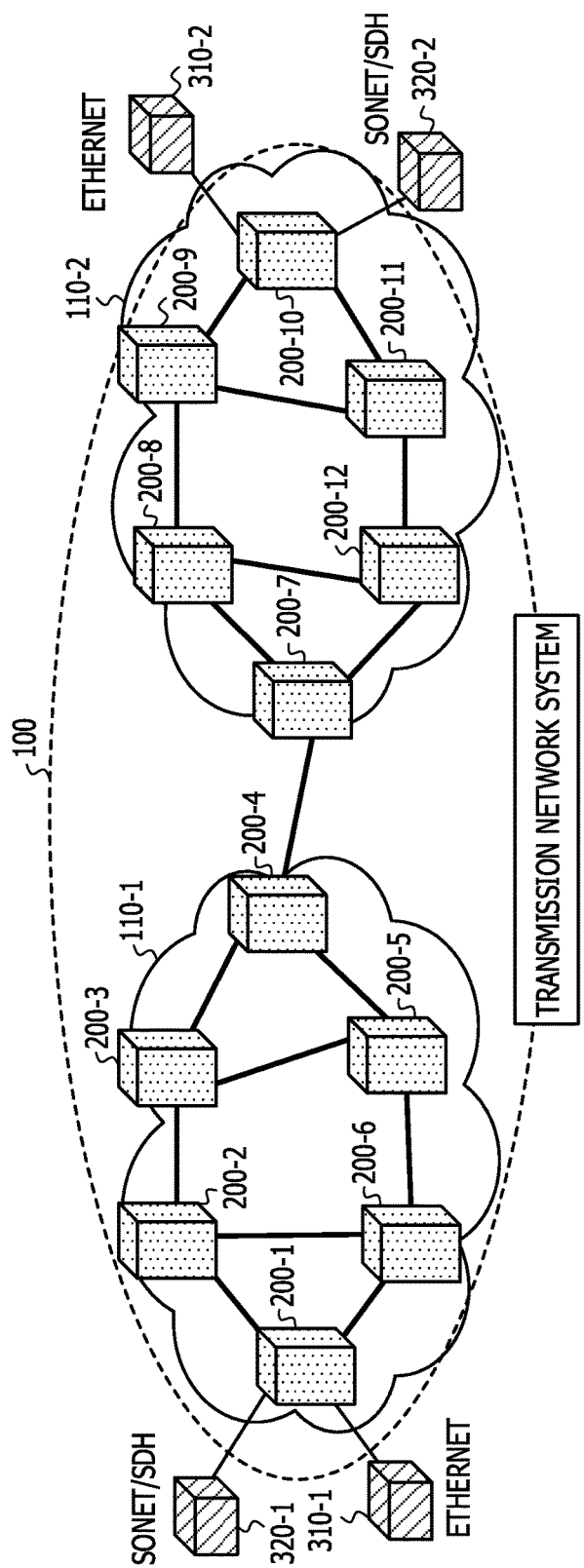
FIG. 4 is a view illustrating the configuration of an exemplary transmission network system including transmission devices according to an embodiment.

FIG. 4 is a view illustrating the configuration of an exemplary transmission network system including transmission devices according to an embodiment. A transmission network system 100 is, for example, an optical communication network system conforming to OTN. In the example illustrated in FIG. 4, the transmission network system 100 includes 12 transmission devices 200-1 to 200-12. The transmission devices 200-1 to 200-12 are one example of the transmission devices according to the embodiment. In the following description, the transmission devices 200-1 to 200-12 are collectively referred to as a transmission device 200 unless there is a particular reason for distinguishing each of the transmission devices 200-1 to 200-12. Although the 12 transmission devices 200-1 to 200-12 are illustrated in FIG. 4, the number of transmission device 200 included in the transmission network system 100 may be optionally two or more.

In the example illustrated in FIG. 4, six transmission devices 200-1 to 200-6 are included in a carrier network 110-1 managed by any carrier and the remaining six transmission devices 200-7 to 200-12 are included in a carrier network 110-2 managed by a separate carrier. In the following description, the carrier networks 110-1 and 110-2 are collectively referred to as a carrier network 110 unless there is a particular reason for distinguishing each of the carrier networks 110-1 to 110-2. Although the two carrier networks 110-1 and 110-2 are illustrated in FIG. 4, the number of carrier network 110 included in the transmission network system 100 may be optionally one or more.

In the example illustrated in FIG. 4, in the carrier network 110-1, the transmission device 200-1, the transmission device 200-2 and the transmission device 200-6 are connected and the transmission device 200-2, the transmission device 200-3 and the transmission device 200-6 are connected. In addition, the transmission device 200-3, the transmission device 200-4 and the transmission device 200-5 are connected and the transmission device 200-5, the transmission device 200-4 and the transmission device 200-6 are connected. In addition, in the carrier network 110-2, the transmission device 200-7, the transmission device 200-8 and the transmission device 200-12 are connected and the transmission device 200-8, the transmission device 200-9 and the transmission device 200-12 are connected. In addition, the transmission device 200-9, the transmission device 200-10, and the transmission device 200-11 are connected, and the transmission device 200-11, the transmission device 200-10, and the transmission device 200-12 are connected.

In the example illustrated in FIG. 4, the carrier network 110-1 and the carrier network 110-2 are connected when the transmission device 200-4 and the transmission device 200-7 are connected. In addition, the transmission device 200-1 is connected to a communication device 310-1 conforming to Ethernet® and a communication device 320-1 conforming to SONET/SDN, and the transmission device 200-10 is connected to a communication device 310-2 conforming to Ethernet® and a communication device 320-2 conforming to SONET/SDN. The communication devices 310-1 and 310-2 conforming to Ethernet® and the communication devices 320-1 and 320-2 conforming to SONET/SDN are each one example of devices which exchange a client signal conforming to a specific communication standard such as Ethernet® or SONET/SDN with the transmission device 200.

FIG. 4 illustrates merely a connection example of the transmission device 200. The transmission device 200 included in the transmission network system 100 may be optionally connected to any other transmission device 200 and any other communication device.

As described above, for example, in an OTN, a one bit DM signal in an OTN frame is used to measure path delay time for a predetermined transmission path such as, for example, a path, and a TCM section. Specifically, in the OTN, the path delay time is measured from a point of time when a transmission device inverts a value of the DM signal in the OTN frame to be transmitted to a point of time when the transmission device detects the DM signal having the inverted value in the received OTN frame. Such measurement of path delay time using the DM signal is likely to be autonomously performed by both opposing transmission devices on a transmission path to be measured since both opposing transmission devices are managed by different communication carriers, respectively. If measurements of path delay time by both opposing transmission devices are temporarily competing, both opposing transmission devices invert the value of the DM signal. However, even when the DM signal having the inverted value is detected from the received OTN frame, it is difficult to identify which transmission device has performed such value inversion. If a transmission device which has inverted the value of the DM signal cannot be identified although the measurements of path delay time are likely to be temporarily competing as described above, both opposing transmission devices on the transmission path to be measured may not autonomously measure the path delay time for the transmission path. Therefore, the transmission device 200 according to the embodiment is, for example, configured to perform the path delay measuring process as described below.

First, the transmission device 200 encodes delay measurement information using a delay measurement signal included in each of a plurality of frames. If the transmission network system 100 including the transmission device 200 is a transmission network conforming to OTN, the delay measurement signal included in each of the plurality of frames may be, for example, a DM signal in an OTN frame. The encoded delay measurement information includes a measurement start flag, an identification code of the transmission device 200, and a measurement competition flag.

The measurement start flag is information indicating the measurement start of path delay time for a predetermined transmission path.

The identification code of the transmission device 200 is an identification code uniquely provided to each transmission device 200 included in the transmission network system 100 and also an identification code of the transmission device 200 which performs measurement of the path delay time. In addition, the identification code of the transmission device 200 may be set by an administrator who manages the carrier network 100 including the transmission device 200. In addition, in order to ensure the reliability for the identification code of the transmission device 200, a redundant bit such as a parity bit may be added to the identification code of the transmission device 200.

The measurement competition flag is information indicating whether or not measurements of the path delay time for the transmission path by the transmission device 200 and a counterpart device are competing in the transmission device 200. The counterpart device is a transmission device 200 which opposes the transmission device 200, which performs the measurement of the path delay time, on the transmission path to be measured. In the following description, the phase "measurements of the path delay time for the transmission path by the transmission device 200 and a counterpart device are competing in the transmission device 200" may be sometimes referred to as "measurement competition."

The transmission device 200 transmits the plurality of frames including the delay measurement information to the counterpart device via the transmission path to be measured. The transmission device 200 detects the delay measurement information from the plurality of frames returned from the counterpart device via the transmission path to be measured. The transmission device 200 identifies which one of the transmission device 200 and the counterpart device has generated the detected delay measurement information transmission device by determining whether or not the identification code included in the detected delay measurement information is the identification code of the transmission device 200. In addition, the transmission device 200 identifies whether or not the measurements of the path delay time by the transmission device 200 and the counterpart device are competing in the counterpart device by referring to the measurement competition flag included in the detected delay measurement information, and identifies whether or not the measurement of the path delay time by the transmission device 200 is successful.

Thus, according to the transmission device 200 of this embodiment, both opposing transmission devices 200 on the transmission path to be measured can autonomously measure the path delay time for the transmission path. That is, irrespective of whether or not the counterpart device measures the path delay time for the transmission path between the transmission device 200 and the counterpart device, the transmission device 200 can autonomously measure the path delay time for the transmission path.

In addition, the transmission device 200 inserts information of a plurality of bits, which is used to autonomously measure the path delay time for the transmission path by the transmission device 200, sequentially in the measurement delay signal included in the plurality of frames to be transmitted. One example of the information used for the transmission device 200 to autonomously measure the path delay time for the transmission path may include the above-mentioned delay measurement information. For example, if a frame to be transmitted is an OTN frame, the transmission device 200 sequentially inserts the delay measurement information in a one bit DM signal included in a plurality of OTN frames. As described above, the DM signal is defined in ITU-TG.709 for the purpose of measurement of the path delay time. Accordingly, the transmission device 200 can exchange the information, which is used for the transmission device to autonomously measure the path delay time for the transmission path, with the counterpart device using the delay measurement signal defined in the specific communication standard.

Figure 5:
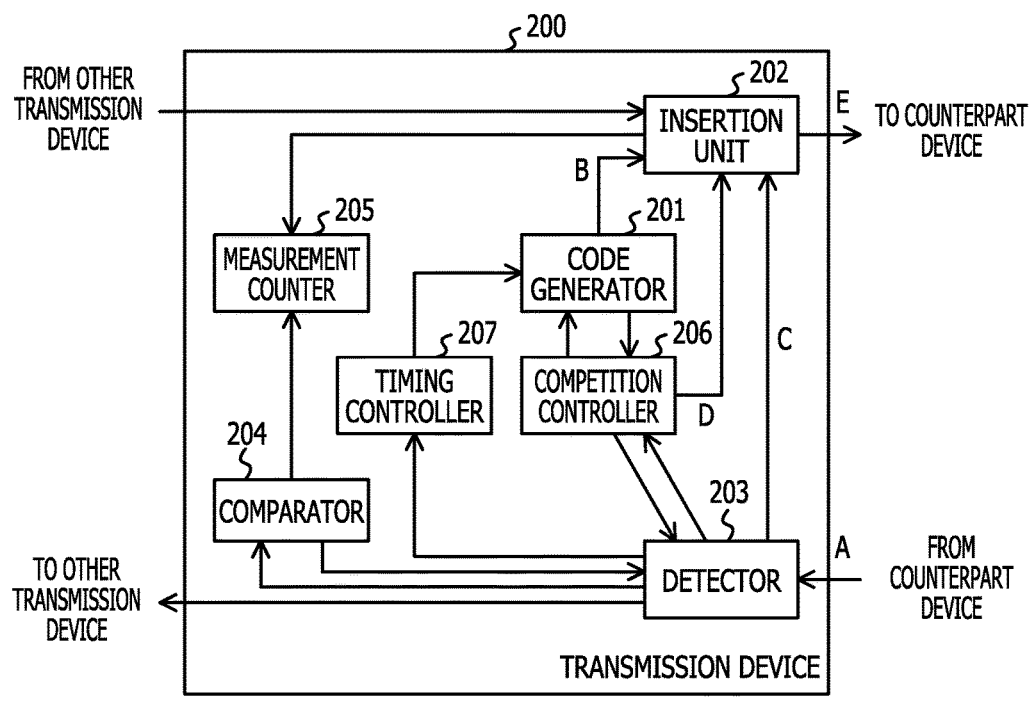
FIG. 5 is an exemplary functional configuration view of a transmission device according to an embodiment.

FIG. 5 is an exemplary functional configuration view of a transmission device according to an embodiment. As illustrated in FIG. 5, the transmission device 200 includes a code generator 201, an insertion unit 202, a detector 203, a comparator 204, a measurement counter 205, a competition controller 206 and a timing controller 207.

The code generator 201 generates delay measurement information to be used for the transmission device 200 to measure path delay time for a transmission path to be measured. The delay measurement information generated by the code generator 201 includes a measurement start flag, an identification code of the transmission device 200, and a measurement competition flag. The measurement start flag generated by the code generator 201 is set and the measurement competition flag generated by the code generator 201 is not set. The code generator 201 informs the competition controller 206 of a point of time when the identification code of the transmission device 200 is generated. The code generator 201 transmits the generated delay measurement information according to a transmission instruction received from the competition controller 206, to the insertion unit 202.

The detector 203 receives a plurality of frames transmitted from a counterpart device on the transmission path to be measured, and detects the delay measurement information from each delay measurement signal in the received plurality of frames. The detected delay measurement information includes a measurement start flag, an identification code of the transmission device 200 or the counterpart device, and a measurement competition flag. The detector 203 detects the delay measurement information including the measurement start flag by detecting the set measurement start flag. The detector 203 transmits the detected identification code to the comparator 204.

Upon receiving a notification, which indicates that the identification code detected by the detector 203 is the identification code of the transmission device 200, from the comparator 204, the detector 203 checks whether or not the detected measurement competition flag is set. "The measurement competition flag is set" means that measurements of path delay time for the transmission path by the transmission device 200 and the counterpart device are competing in the counterpart device. Upon checking that the detected measurement competition flag is set, the detector 203 informs the timing controller 207 of the fact that the detected measurement competition flag is set.

In the meantime, upon receiving a notification, which indicates that the identification code detected by the detector 203 is the identification code of the counterpart device, from the comparator 204, the detector 203 informs the competition controller 206 of a point of time when the identification code of the counter device is detected. When the competition controller 206 is instructed to set the detected measurement competition flag, the detector 203 sets the detected measurement competition flag. The detector 203 transmits the detected delay measurement information (which may include the set measurement competition flag) to the insertion unit 202 according to an instruction received from the competition controller 206.

In addition, upon receiving frames, which are transmitted to a transmission device 200 other than the counterpart device, from the counterpart device, the detector 203 transmits the received frames to the other transmission device 200.

The insertion unit 202 sequentially inserts the delay measurement information, which is received from the code generator 201, in the delay measurement signal included in each of the plurality of frames according to an insertion instruction received from the competition controller 206. If the transmission device 200 is, for example, a transmission device conforming to OTN, the delay measurement signal inserted with the delay measurement information may be a one bit DM signal. Upon inserting the identification code of the transmission device 200, which is received from the code generator 201, in the delay measurement signal, the insertion unit 202 causes the measurement counter 205 to start the count of the path delay time. The insertion unit 202 sequentially transmits the plurality of frames including the delay measurement information to the counterpart device.

In addition, according to the insertion instruction received from the competition controller 206, the insertion unit 202 sequentially inserts the delay measurement information, which is received from the detector 203, in the delay measurement signal included in each of the plurality of frames. The insertion unit 202 sequentially transmits the plurality of frames including the delay measurement information to the counterpart device.

In addition, upon receiving frames, which are transmitted to the counterpart device, from the other transmission device 200, the insertion unit 202 transmits the received frames to the counterpart device.

The comparator 204 compares the identification code generated by the code generator 201 and the identification code detected by the detector 203. As described above, the identification code generated by the code generator 201 is the identification code of the transmission device 200 performing the measurement of path delay time. The identification code detected by the detector 203 is the identification code of the transmission device 200 or the identification code of the counterpart device. The comparator 204 informs the detector 203 of a result of the comparison made to determine whether the detected identification code is the identification code of the transmission device 200 or the identification code of the counterpart device. As the result of the comparison, if both identification codes match, the comparator 204 instructs the measurement counter 205 to terminate the count of path delay time.

The measurement counter 205 is a counter for measuring (counting) the path delay time for the transmission path to be measured. When the identification code of the transmission device 200 is inserted in the delay measurement signal included in each of the plurality of frames by the insertion unit 202, the measurement counter 205 starts the count of path delay time. If it is determined by the comparator 204 that the identification code generated by the code generator 201 matches the identification code detected by the detector 203, the measurement counter 205 terminates the count of path delay time.

The competition controller 206 prevents the measurements of the path delay time for the transmission path by the transmission device 200 and the counterpart device from competing in the transmission device 200. Specifically, the competition controller 206 controls timings at which the delay measurement information of the transmission device 200, which is generated by the code generator 201, and the delay measurement information of the counterpart device, which is detected by the detector 203, are inserted in the delay measurement signal. For example, the competition controller 206 transmits an instruction, which indicates transmission of the delay measurement information to the insertion unit 202, to the code generator 201 and the detector 203 at a predetermined time interval. In addition, the competition controller 206 transmits an instruction, which indicates insertion of the delay measurement information received from the code generator 201 in the delay measurement signal, and an instruction, which indicates insertion of the delay measurement information received from the detector 203 in the delay measurement signal, to the insertion unit 202 at a predetermined time interval. "Predetermined time interval" used herein refers to a time interval corresponding to a predetermined number of frames, which is required to insert different delay measurement information in the delay measurement signal. For example, assuming that the delay measurement information consists of 9 bits and the delay measurement signal included in the frames consists of one bit, the delay measurement information is divided and inserted in each delay measurement signal in the 9 frames. Therefore, in order to allow the different delay measurement information to be inserted in each of the delay measurement signals, the subsequent delay measurement information is, for example, sequentially inserted from a head frame, which is inserted with a head bit of the preceding delay measurement information, to a frame later by ten frames. Therefore, in this case, the predetermined time interval corresponds to ten frames.

In addition, if the timing at which the delay measurement information of the counterpart is inserted in the delay measurement signal is delayed by the insertion timing control, the competition controller 206 instructs the detector 203 to set the measurement competition flag in the detected delay measurement information. As the measurement competition flag is set, the transmission device 200 can specify a delay which occurs in the timing at which the counterpart device inserts the delay measurement information transmitted by the transmission device 200 in the delay measurement signal. That is, when an error occurs in the measurement of path delay time using the delay measurement information, the transmission device 200 can specify that the measurement of path delay time is unsuccessful.

The timing controller 207 controls a timing at which the transmission device 200 starts the measurement of path delay time. For example, if the frequency at which the measurements of path delay time by the transmission device 200 and the counterpart device are competing in the counterpart device is high, the timing controller 207 delays the timing at which the transmission device 200 starts the measurement of path delay time. Specifically, the timing controller 207 receives from the detector 203 a notification indicating that a measurement competition flag, which is transmitted by the transmission device 200 and is returned from the counterpart device, is set. The timing controller 207 counts the number of times of competitions notified from the detector 203. By counting the number of times of competitions, the timing controller 207 monitors the frequency at which the measurement of path delay time is successful.

If the counted number of times of competitions exceeds a predetermined value, the timing controller 207 delays a generation timing at which the code generator 201 generates the delay measurement information, by a predetermined time. For example, after the predetermined time elapses, the timing controller 207 instructs the code generator 201 to generate the delay measurement information. The measurement of path delay time by the transmission device 200 is started with a delay by the predetermined time due to the control by the timing controller 207. This results in an avoidance of the measurement of path delay time by the transmission device 200 and the measurement of path delay time by the counter device from temporal competition.

Figure 6:
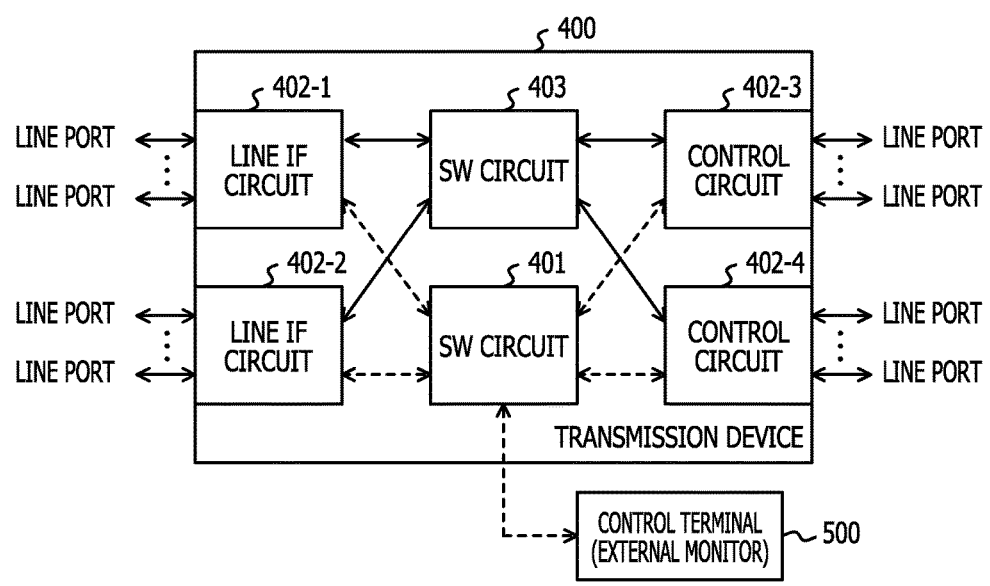
FIG. 6 is an exemplary hardware configuration view of a transmission device according to an embodiment.

FIG. 6 is an exemplary hardware configuration view of a transmission device according to an embodiment. As illustrated in FIG. 6, a transmission device 400 includes a control circuit 401, four line interface (IF) circuits 402-1 to 402-4 and a switch (SW) circuit 403. In FIG. 6, a solid arrow connecting between circuits indicates a data signal line and a dotted arrow indicates a control signal line. In the following description, the four line interface circuits 402-1 to 402-4 are referred to as a line interface circuit 402 unless the line interface circuits 402-1 to 402-4 are particularly distinguished from each other.

The control circuit 401 is connected with the line interface circuit 402 and the switch circuit 403 in the transmission device 400 via control signal lines and is responsible for various settings of each circuit in the transmission device 400, alarm, and collection of statistic information. In addition, the control circuit 401 is connected with a control terminal 500 (e.g., an external monitor) which instructs, for example, measurement of path delay time for a predetermined transmission path. The control circuit 401 may be a removable module or card.

The line interface circuit 402 has line ports connecting with other transmission devices adjacent to the transmission device 402 and provides the interface function for communication with the other transmission devices. The line interface circuit 402 processes frames received from the other transmission devices and processes frames to be transmitted to the other transmission devices. In addition, the line interface circuit 402 measures the path delay time for the predetermined transmission path according to an instruction from the control circuit 401 and transmits a result of the measurement to the control circuit 401. The line interface circuit 402 corresponds to the code generator 201, the insertion unit 202, the detector 203, the comparator 204, the measurement counter 205, the competition controller 206 and the timing controller 207. The line interface circuit 402 may be a removable module or card.

The switch circuit 403 is connected with the line interface circuit 402 in the transmission device 400 via data signal lines and provides the switch function for frame transmission among the line interface circuit 402. The switch circuit 403 may be a removable module or card.

In addition, the control circuit 401, the line interface circuit 402 and the switch circuit 403 may be integrated with a mother board (or a mother card) of the transmission device 400. Although the four line interface circuits 402 are illustrated in FIG. 6, the number of line interface circuits 402 included in the transmission device 400 may be optionally one or more.

Figure 7:
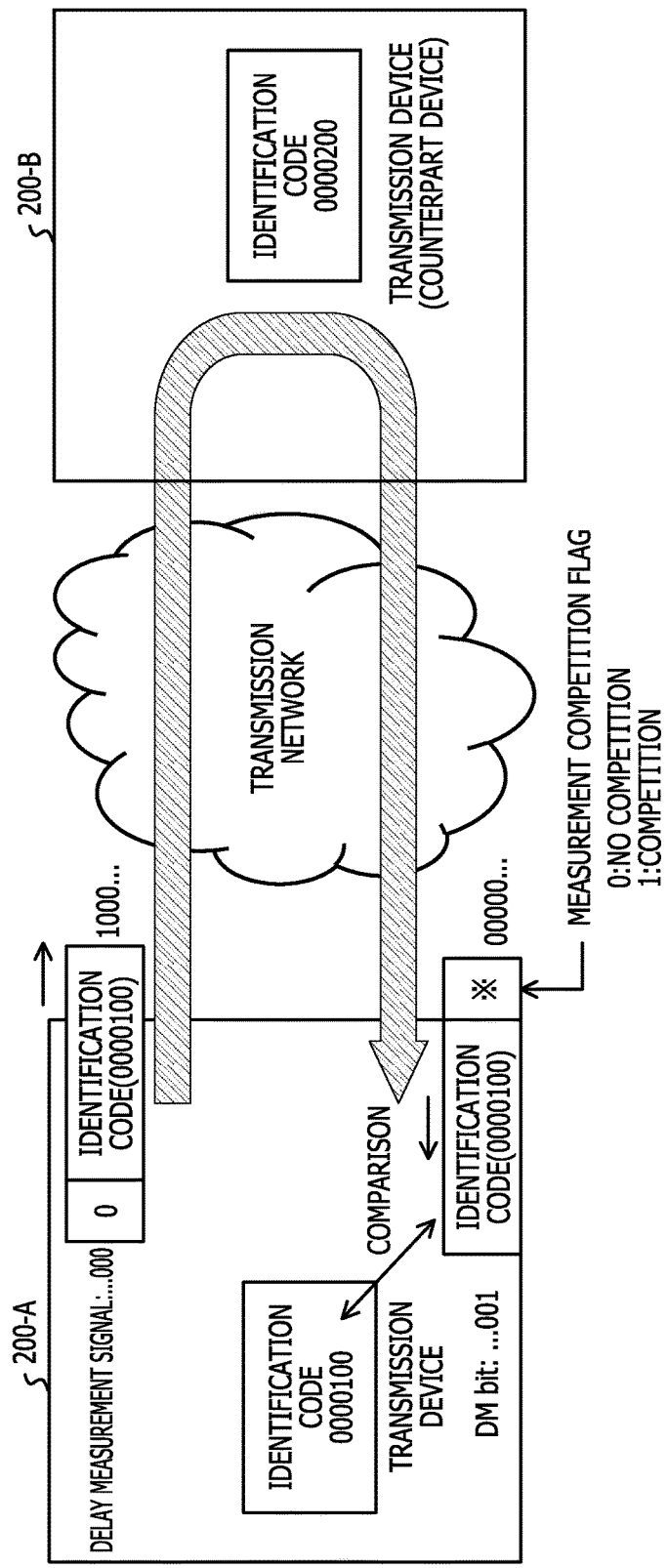
FIG. 7 is an explanatory view of path delay measurement made by a transmission device according to an embodiment.

One example of detailed operation of the various parts of the transmission device 200 will be described below. FIG. 7 is an explanatory view of path delay measurement made by a transmission device according to an embodiment. FIG. 7 illustrates one example of measurement of path delay time performed by a transmission device 200-A for a predetermined transmission path between a first transmission device 200-A and a second transmission device 200-B. The first transmission device 200-A and the second transmission device 200-B are any transmission devices 200 included in the transmission network system 100.

First, the code generator 201 of the first transmission device 200-A generates delay measurement information including a measurement start flag, an identification code and a measurement competition flag of the first transmission device 200-A. The code generator 201 transmits the generated delay measurement information to the insertion unit 202.

Figure 8:
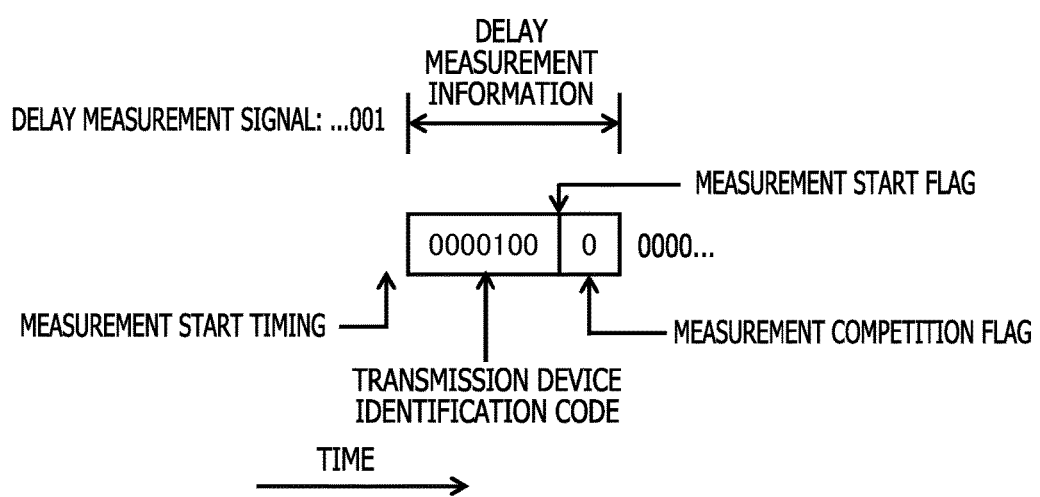
FIG. 8 is a view illustrating an example of a delay measurement signal string inserted with delay measurement information.

The insertion unit 202 of the first transmission device 200-A receives the delay measurement information transmitted from the code generator 201. The insertion unit 202 sequentially inserts the received delay measurement information in a delay measurement signal included in each of a plurality of frames transmitted to the second transmission device 200-B via the transmission path to be measured. FIG. 8 is a view illustrating an example of a delay measurement signal string inserted with delay measurement information. FIG. 8 illustrates an exemplary case where a one bit delay measurement signal is included in each of the plurality of frames. For example, if the frames to be inserted with the delay measurement information are OTN frames, the one bit delay measurement signal included in each frame is a DM signal (DMp signal or DMti signal). One bit information included in the delay measurement information is sequentially inserted in the delay measurement signal in each frame along the right direction from the left indicated by an arrow "TIME" in FIG. 8. Then, the delay measurement signal inserted with the delay measurement information is sequentially transmitted to a counterpart device via the transmission path to be measured.

Specifically, the insertion unit 202 first inserts a measurement start flag, which is received from the code generator 201, in the delay measurement signal in the frames. For example, if a value of a measurement start flag unused is "0," the code generator 201 generates "1," which is an inversion of "0," as a measurement start flag and transmits the generated delay measurement information to the insertion unit 202. Therefore, in the example illustrated in FIG. 8, the insertion unit 202 first inserts the value "0" of the measurement start flag, which is received from the code generator 201, in the delay measurement signal in a frame.

Next, the insertion unit 202 inserts an identification code of the transmission device 200, which is received from the code generator 201, in the delay measurement signal in the subsequent frame. For example, if the number of bits of the identification code of the transmission device 200 is 7, the insertion unit 202 sequentially inserts each one bit, which is included in the identification code of the transmission device 200, in the delay measurement signal in the seven frames. In the example illustrated in FIG. 8, the insertion unit 202 sequentially inserts each one bit of the identification "0000100" of the first transmission device 200-A in the delay measurement signal in the seven frames. The number of bits of the identification code of the transmission device 200 may be optional without being limited to 7. After inserting the identification code of the transmission device 200 in the delay measurement signal, the insertion unit 202 causes the measurement counter 205 to start the count of the path delay time.

Then, the insertion unit 202 inserts a measurement competition flag, which is received from the code generator 201, in the delay measurement signal in the subsequent frame. In the example illustrated in FIG. 8, a value "0" indicating a state where the measurement competition flag is not set is inserted in the delay measurement signal. Thus, as illustrated in FIG. 7, whenever each one bit included in the delay measurement information is sequentially inserted in the delay measurement signal, the frames including the delay measurement information are transmitted from the first transmission device 200-A to the second transmission device 200-B via the insertion unit 202.

As illustrated in FIG. 7, the plurality of frames including the delay measurement information, which is transmitted from the first transmission device 200-A, is received by the second transmission device 200-B. The second transmission device 200-B transmits the plurality of frames including the delay measurement information, which is transmitted by the first transmission device 200-A, to the first transmission device 200-A.

The detector 203 of the first transmission device 200-A sequentially receives the frames transmitted from the second transmission device 200-B. Then, the detector 203 detects the measurement start flag from the delay measurement signal of the received frames. After detecting the measurement start flag, the detector 203 detects the identification code of the transmission device 200 or the counterpart device from the delay measurement signal in frames subsequent to the frames from which the measurement start flag is detected. Then, the detector 203 transmits the detected identification code to the comparator 204.

The comparator 204 of the first transmission device 200-A receives the identification code of the transmission device 200 or the counterpart device transmitted from the detector 203. Then, the comparator 204 compares the received identification code to the identification code of the transmission device 200 to determine whether or not both identification codes match. In the example illustrated in FIG. 7, the comparator 204 determines whether or not the received identification code matches the identification code "0000100" of the first transmission device 200-A. If it is determined that both identification codes match, the comparator 204 causes the measurement counter 205 to terminate the count of the path delay time. Thus, the path delay time for the predetermined transmission path is acquired by the count value of the measurement counter 205.

In this manner, the transmission device 200 compares the identification code of the transmission device 200 to the identification code included in the delay measurement signal in the frames received from the counterpart device. According to this comparison, the transmission device 200 identifies which one of the transmission device 200 and the counterpart device has transmitted the delay measurement information indicated by the delay measurement signal in the received frames. Therefore, according to the transmission device 200, it is possible to measure the path delay time for the corresponding transmission path, irrespective of whether or not the counterpart device measures the path delay time for the transmission path between the transmission device 200 and the counterpart device.

In addition, as described above, the transmission device 200 inserts the information used for the transmission device 200 to autonomously measure the path delay time, for example, the identification code of the transmission device 200, in the delay measurement signal included in the frames to be transmitted. For example, if the frames to be transmitted are OTN frames, the transmission device 200 sequentially inserts the identification code of the transmission device 200 in a one bit DM signal included in each of a plurality of OTN frames. As described above, the DM signal is defined in ITU-TG.709 for use in measurement of the path delay time. Therefore, the transmission device 200 can exchange the information, which is used for the transmission device 200 to autonomously measure the path delay time for the transmission path, with the counterpart device using the delay measurement signal defined in the specific communication standard such as ITU-TG.709.

Next, a case where measurements of path delay time for a transmission path by the transmission device 200 and the counterpart device are competing in the counter device will be described by way of an example. For example, it is assumed that the delay measurement information transmitted by the first transmission device 200-A has been detected by the detector 203 in the second transmission device 200-B. In addition, it is assumed that the delay measurement information has been generated by the code generator 201 in the second transmission device 200-B. In the second transmission device 200-B, timings at which the generated delay measurement information of the second transmission device 200-B and the detected delay measurement information of the first transmission device 200-A are inserted in the delay measurement signal are controlled by the competition controller 206 as follows.

The competition controller 206 performs control such that the timing at which the delay measurement information generated by the code generator 201 is inserted in the delay measurement signal does not compete with the timing at which the delay measurement information detected by the detector 203 is inserted in the delay measurement signal. Specifically, the competition controller 206 receives a notification of a point of time when the identification code of the transmission device 200 (for example, the second transmission device 200-B) is generated, from the code generator 201. In addition, the competition controller 206 receives a notification of a point of time when the identification code of the counterpart device (for example, the first transmission device 200-A) is detected, from the detector 203. The competition controller 206 delays a timing at which the delay measurement information related to a later one of both notified points of time is inserted in the delay measurement signal.

FIG. 9 is a view illustrating a first example for explaining a timing at which delay measurement information of a transmission device and a counterpart device is inserted in a delay measurement signal. Signal lines A to D illustrated in (2) to (6) of FIG. 9 correspond to the signal lines A to D illustrated in FIG. 5, respectively. FIG. 9 illustrates a case where a point of time when the delay measurement information transmitted by the counterpart device is detected by the detector 203 is earlier than a point of time when the delay measurement information of the transmission device 200 is generated by the code generator 201. The competition controller 206 performs control such that the delay measurement information detected by the detector 203 is inserted in the delay measurement signal by the insertion unit 202 earlier than the delay measurement information generated by the code generator 201. That is, the competition controller 206 delays an insertion timing at which the delay measurement information generated by the code generator 201 is inserted in the delay measurement signal by the insertion unit 202.

Specifically, in the example illustrated in (1) and (2) of FIG. 9, the detector 203 detects the identification code of the counterpart device, which is transmitted by the counterpart device, at a point of time earlier than a point of time when the identification code of the transmission device 200 is generated by the code generator 201. The detector 203 informs the competition controller 206 of the detection point of time. Upon receiving a notification of the detection point of time, the competition controller 206 instructs the detector 203 to transmit the detected delay measurement information to the insertion unit 202. As illustrated in (4) of FIG. 9, the detector 203 transmits the detected delay measurement information to the insertion unit 202 according to the instruction received from the competition controller 206.

In addition, the competition controller 206 instructs the insertion unit 202 to insert the delay measurement information, which is received from the detector 203, in the delay measurement signal. Specifically, the competition controller 206 transmits an insertion permission signal, which permits the insertion unit 202 to insert the delay measurement information received from the detector 203 in the delay measurement signal, to the insertion unit 202. In the example illustrated in (5) of FIG. 9, the competition controller 206 instructs the insertion unit 202 to insert the delay measurement information received from the detector 203 in the delay measurement signal, by setting a value of the insertion permission signal to "0." As illustrated in (6) of FIG. 9, the insertion unit 202 inserts the delay measurement information, which is received from the detector 203, in the delay measurement signal according to the insertion instruction received from the competition controller 206.

In the meantime, in the example illustrated in (1) and (2) of FIG. 9, the code generator 201 generates the identification code of the transmission device 200 at a point of time later than the point of time when the identification code of the counterpart device is detected by the detector 203. The code generator 201 informs the competition controller 206 of the generation point of time. Upon receiving a notification of the generation point of time, the competition controller 206 determines whether or not the timing at which the delay measurement information generated by the code generator 201 is inserted in the delay measurement signal competes with the timing at which the delay measurement information detected by the detector 203 is inserted in the delay measurement signal. Specifically, the competition controller 206 determines whether one of the generated delay measurement information and the detected delay measurement information is generated or detected while the other is inserted in the delay measurement signal.

For example, it is assumed that the number of bits of the generated or detected delay measurement information is 9. In addition, it is assumed that the temporally later delay measurement information is sequentially inserted from a head frame, which is inserted with a head bit of the preceding delay measurement information, to a frame later by ten frames such that timings at which the plurality of delay measurement information is inserted in the delay measurement signal do not compete with each other. Under this assumption, the competition controller 206 determines whether or not an interval between the detection point of time and the generation point of time is less than a time interval corresponding to ten frames. In the example illustrated in (1) and (2) of FIG. 9, the interval between the detection point of time and the generation point of time is less than the time interval corresponding to ten frames. Therefore, the competition controller 206 determines that the timings at which the generated or detected delay measurement information is inserted in the delay measurement signal compete with each other.

When it is determined that the timings at which the generated or detected delay measurement information is inserted in the delay measurement signal compete with each other, the competition controller 206 delays a timing at which the subsequent delay measurement information is inserted in the delay measurement signal. Specifically, the competition controller 206 performs control such that, after a head bit of the preceding delay measurement information is inserted in the delay measurement signal, a predetermined number of frames are emptied and the subsequent generated delay measurement information is sequentially inserted in the delay measurement signal. "Predetermined number of frames" used herein refers to frames required to insert different delay measurement information in the delay measurement signal. In the example illustrated in FIG. 9, a predetermined frame interval is 10 frames.

For example, the competition controller 206 waits for a predetermined period of time after instructing the detector 203 (or the code generator 201) to transmit the preceding detected (or generated) delay measurement information to the insertion unit 202. Then, the competition controller 206 instructs the code generator 201 (or the detector 203) to transmit the subsequent generated (or detected) delay measurement information to the insertion unit 202. "Predetermined period of time" used herein refers to a period of time corresponding to a predetermined number of frames, which is required to insert different delay measurement information in the delay measurement signal. In the example illustrated in FIG. 9, the competition controller 206 waits for a period of time corresponding to 10 frames after instructing the detector 203 to transmit the detected delay measurement information to the insertion unit 202. Then, the competition controller 206 instructs the code generator 201 to transmit the generated delay measurement information to the insertion unit 202.

The code generator 201 transmits the generated delay measurement information to the insertion unit 202 according to the instruction received from the competition controller 206. In the example illustrated in (3) and (4) of FIG. 9, the code generator 201 transmits the delay measurement information to the insertion unit 202 after the period of time corresponding to 10 frames elapses after the detector 203 transmits the delay measurement information.

In addition, the competition controller 206 waits for a predetermined period of time after transmitting an insertion permission signal, which permits the insertion unit 202 to insert the proceeding received delay measurement information in the delay measurement signal, to the insertion unit 202. Then, the competition controller 206 transmits an insertion permission signal, which permits the insertion unit 202 to insert the subsequent received delay measurement information in the delay measurement signal, to the insertion unit 202. As described above, "predetermined period of time" used herein refers to a period of time corresponding to a predetermined number of frames, which is required to insert different delay measurement information in the delay measurement signal.

In the example illustrated in FIG. 9, the competition controller 206 waits for a period of time corresponding to 10 frames after transmitting the insertion permission signal, which permits the insertion unit 202 to insert the delay measurement information received from the detector 203 in the delay measurement signal, to the insertion unit 202. Then, the competition controller 206 transmits the insertion permission signal, which permits the insertion unit 202 to insert the delay measurement information received from the code generator 201 in the delay measurement signal, to the insertion unit 202. In the example illustrated in (5) of FIG. 9, the competition controller 206 instructs the insertion unit 202 to insert the delay measurement information received from the code generator 201 in the delay measurement signal, by setting a value of the insertion permission signal to "1."

The insertion unit 202 inserts the subsequent received delay measurement information in the delay measurement signal according to the insertion instruction received from the competition controller 206. In the example illustrated in (6) of FIG. 9, after 10 frames after inserting a head bit of the delay measurement information received from the detector 203 in the delay measurement signal, the insertion unit 202 inserts the delay measurement information, which is received from the code generator 201, in the delay measurement signal.

In this manner, in the second transmission device 200-B, the competition controller 206 performs control such that the timing at which the delay measurement information generated by the code generator 201 is inserted in the delay measurement signal does not compete with the timing at which the delay measurement information detected by the detector 203 is inserted in the delay measurement signal. In addition, as illustrated in the example of FIG. 9, if the detection point of time is earlier than the generation point of time, the timing at which the delay measurement information detected by the detector 203 is inserted in the delay measurement signal is not delayed. This allows the first transmission device 200-A to measure the path delay time using the delay measurement information returned from the second transmission device 200-B. Therefore, the transmission device 200 according to this embodiment can autonomously measure the path delay time for the corresponding transmission path, irrespective of whether or not the measurements of the path delay time for the transmission path by the transmission device 200 and the counterpart device are competing in the transmission device 200.

FIG. 10 is a view illustrating a second example for explaining a timing at which delay measurement information of a transmission device and a counterpart device is inserted in a delay measurement signal. Signal lines A to D illustrated in (2) to (6) of FIG. 10 correspond to the signal lines A to D illustrated in FIG. 5, respectively. FIG. 10 illustrates a case where a point of time when the delay measurement information of the transmission device 200 is generated by the code generator 201 is earlier than a point of time when the delay measurement information transmitted by the counterpart device is detected by the detector 203. The competition controller 206 performs control such that the delay measurement information generated by the code generator 201 is inserted in the delay measurement signal by the insertion unit 202 earlier than the delay measurement information detected by the detector 203. That is, the competition controller 206 delays an insertion timing at which the delay measurement information detected by the detector 203 is inserted in the delay measurement signal by the insertion unit 202.

Specifically, in the example illustrated in (1) and (2) of FIG. 10, the code generator 201 generates the identification code of the transmission device 200 at a point of time earlier than the point of time when the identification code of the counterpart device is detected by the detector 203. The code generator 201 informs the competition controller 206 of the generation point of time. Upon receiving a notification of the generation point of time, the competition controller 206 instructs the code generator 201 to transmit the generated delay measurement information to the insertion unit 202. As illustrated in (3) of FIG. 10, the code generator 201 transmits the generated delay measurement information to the insertion unit 202 according to the instruction received from the competition controller 206.

In addition, the competition controller 206 instructs the insertion unit 202 to insert the delay measurement information, which is received from the code generator 201, in the delay measurement signal. Specifically, the competition controller 206 transmits an insertion permission signal, which permits the insertion unit 202 to insert the delay measurement information received from the code generator 201 in the delay measurement signal, to the insertion unit 202. In the example illustrated in (5) of FIG. 10, the competition controller 206 instructs the insertion unit 202 to insert the delay measurement information received from the code generator 201 in the delay measurement signal, by setting a value of the insertion permission signal to "1." As illustrated in (6) of FIG. 10, the insertion unit 202 inserts the delay measurement information received from the code generator 201 in the delay measurement signal according to the insertion instruction received from the competition controller 206.

In the meantime, in the example illustrated in (1) and (2) of FIG. 10, the detector 203 detects the identification code of the counterpart device at a point of time later than the point of time when the identification code of the transmission device 200 is generated by the code generator 201. The detector 203 informs the competition controller 206 of the detection point of time. Upon receiving a notification of the detection point of time, the competition controller 206 determines whether or not the timing at which the delay measurement information generated by the code generator 201 is inserted in the delay measurement signal competes with the timing at which the delay measurement information detected by the detector 203 is inserted in the delay measurement signal. Specifically, the competition controller 206 determines whether one of the generated delay measurement information and the detected delay measurement information is generated or detected while the other is inserted in the delay measurement signal.

For example, as described above with reference to FIG. 9, the competition controller 206 determines whether or not an interval between the detection point of time and the generation point of time is less than a time interval corresponding to ten frames. In the example illustrated in (1) and (2) of FIG. 10, the interval between the detection point of time and the generation point of time is less than the time interval corresponding to ten frames. Therefore, the competition controller 206 determines that the timing at which the delay measurement information generated by the code generator 201 is inserted in the delay measurement signal competes with the timing at which the delay measurement information detected by the detector 203 is inserted in the delay measurement signal.

When it is determined that the timings at which the generated or detected delay measurement information is inserted in the delay measurement signal compete with each other, the competition controller 206 delays a timing at which the subsequent delay measurement information is inserted in the delay measurement signal. Specifically, the competition controller 206 performs control such that, after a head bit of the preceding delay measurement information is inserted in the delay measurement signal, a predetermined number of frames are emptied and the subsequent delay measurement information is sequentially inserted in the delay measurement signal. In the example illustrated in FIG. 10, the competition controller 206 waits for a period of time corresponding to 10 frames after instructing the code generator 201 to transmit the generated delay measurement information to the insertion unit 202. Then, the competition controller 206 instructs the detector 203 to transmit the detected delay measurement information to the insertion unit 202.

In addition, as illustrated in the example of FIG. 10, if the subsequent delay measurement information is the delay measurement information transmitted from the counterpart device, the competition controller 206 instructs the detector 203 to set a measurement competition flag included in the subsequent delay measurement information.

The detector 203 sets the detected measurement competition flag according to the instruction received from the competition controller 206. Then, detector 203 transmits the delay measurement information including the set measurement competition flag according to an instruction received from the competition controller 206, to the insertion unit 202. In the example illustrated in (3) and (4) of FIG. 10, the detector 203 transmits the delay measurement information to the insertion unit 202 after the period of time corresponding to 10 frames elapses after the code generator 201 transmits the delay measurement information.

In addition, the competition controller 206 waits for a predetermined period of time after transmitting an insertion permission signal, which permits the insertion unit 202 to insert the proceeding received delay measurement information in the delay measurement signal, to the insertion unit 202. Then, the competition controller 206 transmits an insertion permission signal, which permits the insertion unit 202 to insert the subsequent received delay measurement information in the delay measurement signal, to the insertion unit 202. In the example illustrated in FIG. 10, the competition controller 206 waits for a period of time corresponding to 10 frames after transmitting the insertion permission signal, which permits the insertion unit 202 to insert the delay measurement information received from the code generator 201 in the delay measurement signal, to the insertion unit 202. Then, the competition controller 206 transmits the insertion permission signal, which permits the insertion unit 202 to insert the delay measurement information received from the detector 203 in the delay measurement signal, to the insertion unit 202. In the example illustrated in (5) of FIG. 10, the competition controller 206 instructs the insertion unit 202 to insert the delay measurement information received from the detector 203 in the delay measurement signal, by setting a value of the insertion permission signal to "0."

The insertion unit 202 inserts the delay measurement information, which is received from the detector 203, in the delay measurement signal according to the insertion instruction received from the competition controller 206. In the example illustrated in (6) of FIG. 10, after 10 frames after inserting a head bit of the delay measurement information received from the code generator 201 in the delay measurement signal, the insertion unit 202 inserts the delay measurement information, which is received from the detector 203, in the delay measurement signal.

In this manner, in the second transmission device 200-B, the competition controller 206 performs control such that the timing at which the delay measurement information generated by the code generator 201 is inserted in the delay measurement signal does not compete with the timing at which the delay measurement information detected by the detector 203 is inserted in the delay measurement signal. In addition, as illustrated in the example of FIG. 10, if the generation point of time is earlier than the detection point of time, the competition controller 206 instructs the detector 203 to set the measurement competition flag included in the detected delay measurement information. Then, in the first transmission device 200-A, the detector 203 detects the set delay measurement flag from the delay measurement information returned from the second transmission device 200-B, and specifies an error occurring in the path delay time measurement. "Error occurring in the path delay time measurement" used herein refers to an error occurring when the timing at which the second transmission device 200-B inserts the delay measurement information transmitted by the first transmission device 200-A in the delay measurement signal is delayed. The first transmission device 200-A specifies that the measurement of path delay time using the transmitted delay measurement information is unsuccessful, and decides to generate and transmit again the delay measurement information in order to measure the path delay time again. Therefore, the transmission device 200 according to this embodiment can autonomously measure the path delay time for the corresponding transmission path, irrespective of whether or not the measurements of the path delay time for the transmission path by the transmission device 200 and the counterpart device are competing in the transmission device 200.

In addition, as described above, the transmission device 200 according to the embodiment inserts the information used for the transmission device 200 to autonomously measure the path delay time for the transmission path, for example, the measurement competition flag, in the delay measurement signal included in the frames to be transmitted. For example, if the frames to be transmitted are OTN frames, the transmission device 200 inserts the measurement competition flag in a one bit DM signal included in the OTN frames. As described above, the DM signal is defined in ITU-TG.709 for use in measurement of the path delay time. Therefore, the transmission device 200 can exchange the information, which is used for the transmission device 200 to autonomously measure the path delay time for the transmission path, with the counterpart device using the delay measurement signal defined in the specific communication standard such as ITU-TG.709.

A path delay measuring method performed by the transmission device 200 according to an embodiment will be described by way of example with reference to FIGS. 11A, 11B and 12.

Figure 11A:
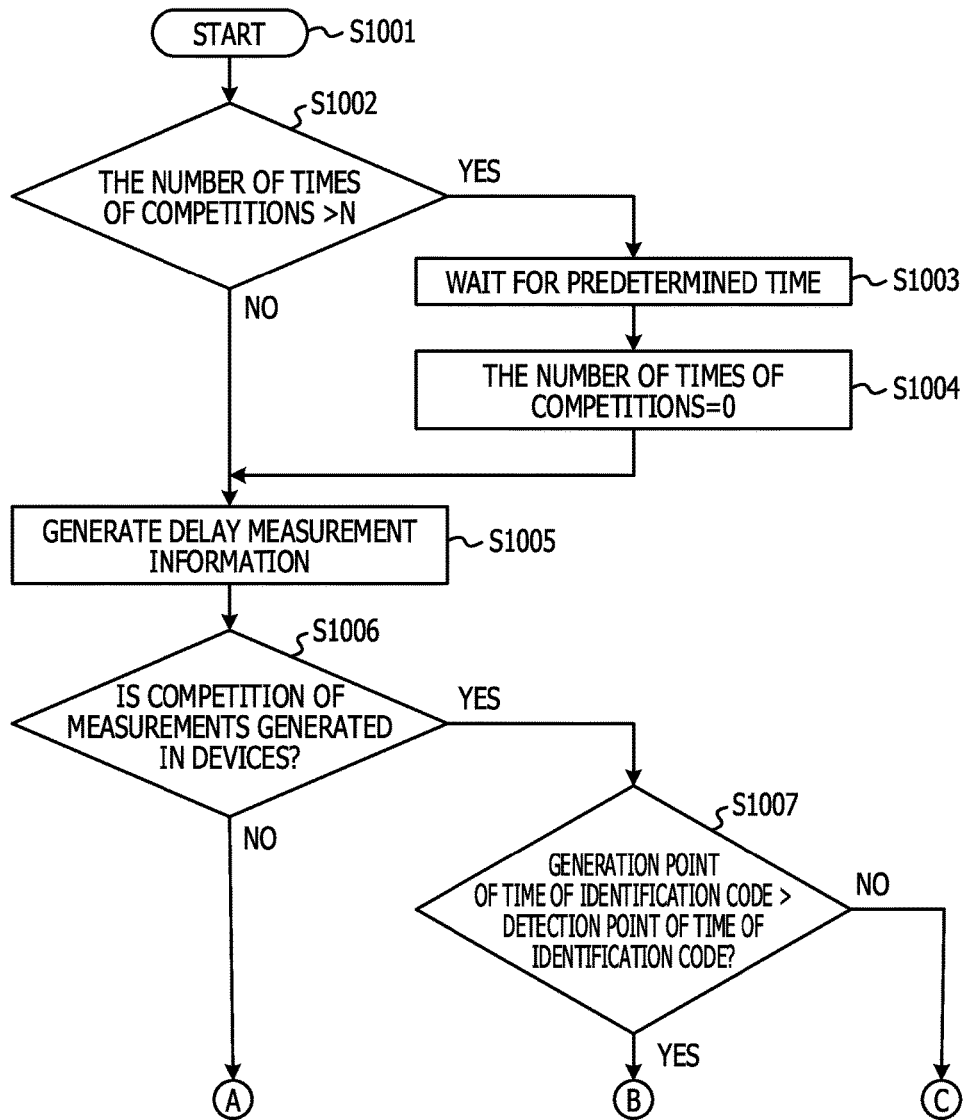
FIG. 11A is a flow chart illustrating an exemplary delay measurement information transmission process performed by a transmission device according to an embodiment.
Figure 11B:
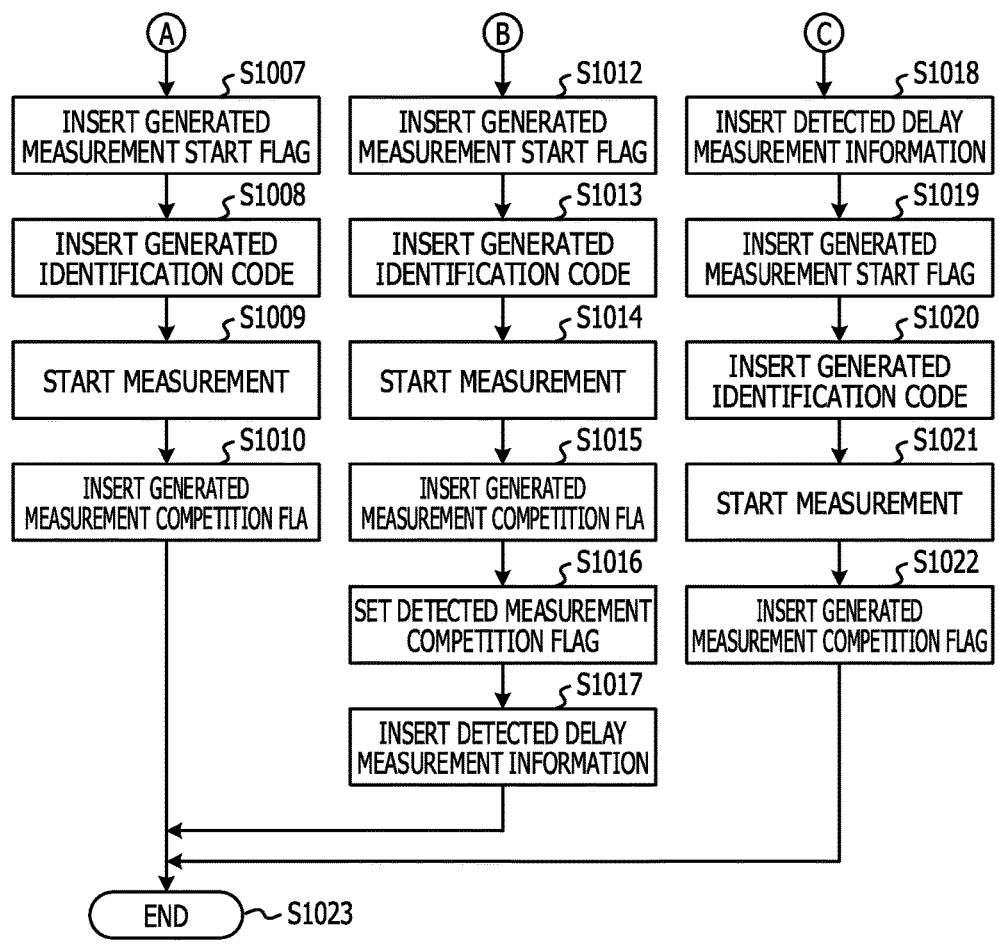
FIG. 11B is a flow chart illustrating an exemplary delay measurement information transmission process performed by a transmission device according to an embodiment.

FIGS. 11A and 11B are flow charts illustrating an exemplary delay measurement information transmission process performed by a transmission device according to an embodiment. The transmission device 200 starts a series of processes for transmitting delay measurement information to the counterpart device in order to measure the path delay time for a predetermined transmission path (Operation S1001). The timing controller 207 determines whether or not the counted number of times of competitions exceeds a preset certain value N (Operation S1002). As described above, the number of times of competitions is the number of times by which the measurements of path delay time by the transmission device 200 and the counterpart device are competing in the counterpart device.

If it is determined that the counted number of times of competitions is less than the preset certain value N ("NO" in Operation S1002), the timing controller 207 instructs the code generator 201 to generate the delay measurement information.

In the meantime, if it is determined that the counted number of times of competitions exceeds the preset certain value N ("YES" in Operation S1002), the timing controller 207 waits for a predetermined period of time in order to delay a generation timing at which the code generator 201 generates the delay measurement information, by a predetermined time. After the predetermined time elapses, the timing controller 207 resets a value of the number of times of competitions to "0" (Operation S1003). Then, the timing controller 207 instructs the code generator 201 to generate the delay measurement information.

The code generator 201 generates the delay measurement information according to the instruction received from the timing controller 207 (Operation S1005). Specifically, the code generator 201 first generates a measurement start flag and then generates an identification code of the transmission device 200. The code generator 201 informs the competition controller 206 of the generation point of time at which the identification code of the transmission device 200 is generated. Then, the code generator 201 generates the measurement competition flag.

The competition controller 206 determines whether or not measurements of path delay time for the transmission path to be measured by the transmission device 200 and the counterpart device are competing in the transmission device 200 (Operation S1006). Specifically, the competition controller 206 determines whether or not an interval between the generation point of time when the delay measurement information is received from the code generator 201 and the detection point of time when the delay measurement information is received from the detector 203 is less than a predetermined time interval. As described above, "predetermined time interval" used herein refers to a time interval corresponding to a predetermined number of frames, which is required to insert different delay measurement information in the delay measurement signal. As described above, the detector 203 informs the competition controller 206 of the detection point of time when the identification code of the counterpart device is detected. For example, when the comparator 204 determines that the identification code detected by the detector 203 does not match the identification code generated by the code generator 201, the identification code detected by the detector 203 is specified as the identification code of the counterpart device.

If it is determined that the measurements of path delay time by the transmission device 200 and the counterpart device are not competing in the transmission device 200 ("NO" in Operation S1006), the competition controller 206 instructs the insertion unit 202 to sequentially insert the delay measurement information generated by the code generator 201 in the delay measurement signal. Specifically, the competition controller 206 instructs the code generator 201 to sequentially transmit the generated delay measurement information to the insertion unit 202. In addition, the competition controller 206 instructs the insertion unit 202 to sequentially insert the delay measurement information, which is received from the code generator 201, in the delay measurement signal.

According to the transmission instruction received from the competition controller 206, the code generator 201 transmits the generated measurement start flag to the insertion unit 202. According to the insertion instruction received from the competition controller 206, the insertion unit 202 inserts the measurement start flag, which is received from the code generator 201, in the delay measurement signal in frames transmitted to the counterpart device (Operation S1007). The insertion unit 202 transmits the frames including the measurement start flag in the delay measurement signal to the counterpart device.

According to the transmission instruction received from the competition controller 206, the code generator 201 transmits the generated identification code of the transmission device 200 to the insertion unit 202. According to the insertion instruction received from the competition controller 206, the insertion unit 202 inserts the identification code of the transmission device 200, which is received from the code generator 201, in the delay measurement signal in the frames transmitted to the counterpart device (Operation S1008). Then, after inserting the identification code of the transmission device 200, which is received from the code generator 201, in the delay measurement signal, the insertion unit 202 causes the measurement counter 205 to start the count of the path delay time (Operation S1009). The insertion unit 202 transmits the frames including the identification code of the transmission device 200 in the delay measurement signal to the counterpart device.

According to the transmission instruction received from the competition controller 206, the code generator 201 transmits the generated measurement competition flag to the insertion unit 202. According to the insertion instruction received from the competition controller 206, the insertion unit 202 inserts the measurement competition flag, which is received from the code generator 201, in the delay measurement signal in the frames transmitted to the counterpart device (Operation S1010). The insertion unit 202 transmits frames including the measurement completion flag in the delay measurement signal to the counterpart device. Then, the transmission device 200 ends the series of processes for transmission of the delay measurement information to the counterpart device (Operation S1023).

In the meantime, if it is determined that the measurements of path delay time by the transmission device 200 and the counterpart device are competing in the transmission device 200 ("YES" in Operation S1006), the competition controller 206 determines whether or not the generation point of time is earlier than the detection point of time (Operation S1011).

If it is determined that the generation point of time of the identification code of the transmission device 200 is earlier than the detection point of time of the identification code of the counterpart device ("YES" in Operation S1011), the competition controller 206 delays the timing at which the delay measurement information of the counterpart device is inserted in the delay measurement signal.

Specifically, first, the competition controller 206 instructs the insertion unit 202 to sequentially insert the delay measurement information generated by the code generator 201 in the delay measurement signal. According to the transmission instruction received from the competition controller 206, the code generator 201 sequentially transmits the generated delay measurement information to the insertion unit 202. According to the insertion instruction received from the competition controller 206, the insertion unit 202 sequentially inserts the delay measurement information received from the code generator 201 in the delay measurement signal in the frames transmitted to the counterpart device, and sequentially transmits the frames to the counterpart device. In addition, the insertion unit 202 causes the measurement counter 205 to start the count of the path delay time (Operation S1012 to Operation S1015). The processes in Operation S1012 to Operation S1015 are the same as the above-described processes in Operation S1007 to Operation S1010.

Next, the competition controller 206 instructs the detector 203 to set the detected measurement competition flag. According to the instruction received from the competition controller 206, the detector 203 sets the detected measurement competition flag (Operation S1016).

After a predetermined time elapses after transmitting the transmission instruction to the code generator 201 and the insertion instruction to the insertion unit 202, the competition controller 206 instructs the insertion unit 202 to sequentially insert the delay measurement information detected by the detector 203 in the delay measurement signal. Specifically, the competition controller 206 instructs the detector 203 to sequentially transmit the detected delay measurement information to the insertion unit 202. In addition, the competition controller 206 instructs the insertion unit 202 to sequentially insert the delay measurement information, which is received from the detector 203, in the delay measurement signal. "Predetermined time" used herein refers to a time corresponding to a predetermined number of frames, which is required to insert different delay measurement information in the delay measurement signal.

According to the transmission instruction received from the competition controller 206, the detector 203 sequentially transmits the detected delay measurement information to the insertion unit 202. According to the insertion instruction received from the competition controller 206, the insertion unit 202 sequentially inserts the delay measurement information received from the detector 203 in the delay measurement signal in the frames transmitted to the counterpart device (Operation S1017). The insertion unit 202 sequentially transmits the frames including the delay measurement information in the delay measurement signal to the counterpart device. Then, the transmission device 200 ends the series of processes for transmission of the delay measurement information to the counterpart device (Operation S1023).

In the meantime, if it is determined that the generation point of time of the identification code of the transmission device 200 is equal to or later than the detection point of time of the identification code of the counterpart device ("NO" in Operation S1011), the competition controller 206 delays the timing at which the delay measurement information of the transmission device 200 is inserted in the delay measurement signal.

Specifically, first, the competition controller 206 instructs the insertion unit 202 to insert the delay measurement information detected by the detector 203 in the delay measurement signal. According to the transmission instruction received from the competition controller 206, the detector 203 sequentially transmits the detected delay measurement information to the insertion unit 202. According to the insertion instruction received from the competition controller 206, the insertion unit 202 sequentially inserts the delay measurement information received from the detector 203 in the delay measurement signal in the frames transmitted to the counterpart device, and sequentially transmits the frames to the counterpart device (Operation S1018). The process in Operation S1018 is the same as the above-described process in Operation S1017.

Next, after a predetermined time elapses after transmitting the transmission instruction to the detector 203 and the insertion instruction to the insertion unit 202, the competition controller 206 instructs the insertion unit 202 to sequentially insert the delay measurement information generated by the code generator 201 in the delay measurement signal. According to the transmission instruction received from the competition controller 206, the code generator 201 sequentially transmits the generated delay measurement information to the insertion unit 202. According to the insertion instruction received from the competition controller 206, the insertion unit 202 sequentially inserts the delay measurement information received from the code generator 201 in the delay measurement signal in the frames transmitted to the counterpart device, and sequentially transmits the frames to the counterpart device. In addition, the insertion unit 202 causes the measurement counter 205 to start the count of the path delay time (Operation S1019 to Operation S1022). The processes in Operation S1019 to Operation S1022 are the same as the above-described processes in Operation S1007 to Operation S1010. Then, the transmission device 200 ends the series of processes for transmission of the delay measurement information to the counterpart device (Operation S1023).

Figure 12:
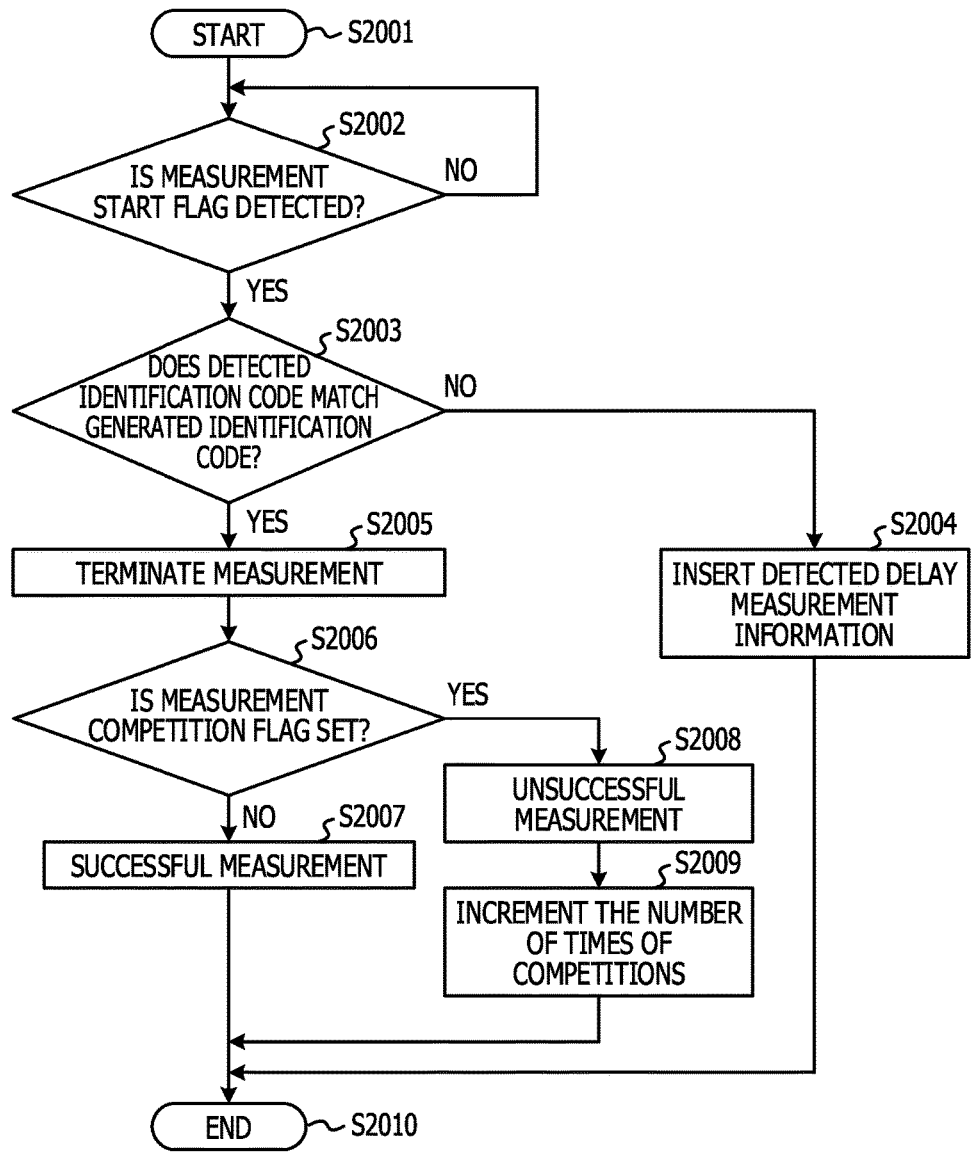
FIG. 12 is a flow chart illustrating an exemplary delay measurement information reception process performed by a transmission device according to an embodiment.

FIG. 12 is a flow chart illustrating an exemplary delay measurement information reception process performed by a transmission device according to an embodiment. The transmission device 200 starts a series of processes for receiving delay measurement information inserted in a delay measurement signal from the counterpart device (Operation S2001). The detector 203 sequentially receives frames transmitted from the counterpart device and waits until a measurement start flag is detected from a delay measurement signal in the received frames ("NO" in Operation 2002). Upon detecting the measurement start flag from the delay measurement signal in the received frames ("YES" in Operation 2002), the detector 203 detects an identification code from a delay measurement signal of frames subsequent to the frames including the delay measurement signal inserted with the measurement start flag. The detector 203 transmits the detected identification code to the comparator 204.

The comparator 204 receives the identification code detected by the detector 203. The comparator 204 compares the identification code detected by the detector 203 to an identification code of the transmission device 200, which is generated by the code generator 201. Then, the comparator 204 determines whether or not both identification codes match (Operation S2003).

If it is determined that both identification codes do not match ("NO" in Operation S2003), the comparator 204 notifies the detector 203 that the detected identification code is an identification code of the counterpart device. According to the notification received from the comparator 204, the detector 203 sequentially transmits the detected delay measurement information to the insertion unit 202. The delay measurement information transmitted by the detector 203 includes the measurement start flag, the identification code of the counterpart device, and a measurement competition flag detected subsequent to the identification code of the counterpart device. The insert unit 202 sequentially inserts the delay measurement information, which is received from the detector 203, in the delay measurement signal in the frames transmitted to the counterpart device (Operation S2004). The insertion unit 202 sequentially transmits the frames including the delay measurement information in the delay measurement signal to the counterpart device. Then, the transmission device 200 ends the series of processes for reception of the delay measurement information from the counterpart device (Operation S2010).

In the meantime, if it is determined that both identification codes match ("YES" in Operation S2003), the comparator 204 causes the measurement counter 205 to terminate count of path delay time (Operation S2005). In addition, the comparator 204 notifies the detector 203 that the detected identification code is the identification code of the transmission device 200. The detector 203 checks whether or not a measurement competition flag detected subsequent to the identification code of the transmission device 200 is set (Operation S2006).

If it is checked that the detected measurement competition flag is not set ("NO" in Operation S2006), the detector 203 specifies that the measurement of path delay time using the delay measurement information is successful (Operation S2007). When it is specified that the measurement of path delay time is successful, the path delay time for a predetermined transmission path between the transmission device 200 and the counterpart device corresponds to a value counted by the measurement counter 205. The transmission device 200 ends the series of processes for reception of the delay measurement information from the counterpart device (Operation S2010).

If it is checked that the detected measurement competition flag is set ("YES" in Operation S2006), the detector 203 specifies that the measurement of path delay time using the delay measurement information is unsuccessful (Operation S2008). The detector 203 notifies the timing controller 207 that the detected measurement competition flag is set. According to the notification received from the detector 203, the timing controller 207 increments the number of times of competitions by one (Operation S2009). Then, the transmission device 200 ends the series of processes for reception of the delay measurement information from the counterpart device (Operation S2010).

If the measurement of path delay time using the delay measurement information is unsuccessful, the transmission device 200 may autonomously perform again the measurement of path delay time, for example by executing the processes as illustrated in FIGS. 11A and 11B. For example, upon being notified from the detector 203 that the detected measurement competition flag is set, the timing controller 207 instructs again the code generator 201 to generate the delay measurement information (Operation S1002 to Operation S1004 in FIG. 11A).

In this manner, the transmission device 200 compares the identification code of the transmission device 200 to the identification code included in the delay measurement signal in the received frames. Due to this comparison, the transmission device 200 identifies which one of the transmission device 200 and the counterpart device has transmitted the delay measurement information indicated by the delay measurement signal in the received frames. Therefore, the transmission device 200 can autonomously measure the path delay time for the corresponding transmission path, irrespective of whether or not the counterpart device measures the path delay time for the transmission path between the transmission device 200 and the counterpart device.

In addition, the transmission device 200 performs control such that the timing at which the generated delay measurement information of the transmission device 200 is inserted in the delay measurement signal does not compete with the timing at which the detected delay measurement information of the counterpart device is inserted in the delay measurement signal. In addition, if the timing at which the delay measurement information of the counterpart device is inserted in the delay measurement signal is delayed due to the insertion timing control, the transmission device 200 returns the set measurement competition flag to the counterpart device. Therefore, the transmission device 200 according to the embodiment can autonomously measure the path delay time for the corresponding transmission path, irrespective of whether or not the measurements of the path delay time for the transmission path by the transmission device 200 and the counterpart device are competing in the transmission device 200.

In addition, depending on whether or not the measurement competition flag in the delay measurement information transmitted by the transmission device 200 and received from the counterpart device is set, the transmission device 200 identifies whether or not the measurement of the path delay time using the delay measurement information is successful. Therefore, the transmission device 200 according to the embodiment can select only the correct path delay time among measured path delay times.

Then, the transmission device 200 sequentially inserts multi-bit information, which is used for the transmission device 200 to autonomously measure the path delay time for the transmission path, in the delay measurement signal included in the plurality of frames to be transmitted. For example, if the frames to be transmitted are OTN frames, the transmission device 200 sequentially inserts the delay measurement information in a one bit DM signal included in each of a plurality of OTN frames. As described above, the DM signal is defined in ITU-TG.709 for use in measurement of the path delay time. Therefore, the transmission device 200 can exchange the information, which is used for the transmission device to autonomously measure the path delay time for the transmission path, with the counterpart device using the delay measurement signal defined in a specific communication standard.

All examples and conditional language recited herein are intended for pedagogical purposes to aid the reader in understanding the present disclosure and the concepts contributed by the inventor to furthering the art, and are to be construed as being without limitation to such specifically recited examples and conditions, nor does the organization of such examples in the specification relate to a illustrating of the superiority and inferiority of the present disclosure. Although the embodiments of the present disclosure have been described in detail, it should be understood that the various changes, substitutions, and alterations could be made hereto without departing from the spirit and scope of the present disclosure.

What is claimed is:

1. A transmission device comprising:
a code generation circuit configured to generate delay measurement information, the delay measurement information including a measurement start flag, an identification code of the transmission device, and a measurement competition flag;
an insertion circuit configured to insert the delay measurement information in a plurality of frames, the delay measurement information being inserted in the plurality of frames such that a first portion of the delay measurement information is inserted in a first frame of the plurality of frames and a second portion of the delay measurement information that is distinct from the first portion is inserted in a second frame of the plurality of frames, and transmit the plurality of frames inserted with the delay measurement information to a counterpart device on a transmission path whose path delay time is to be measured; and
a detection circuit configured to receive the plurality of frames transmitted from the counterpart device, and detect the delay measurement information in the plurality of received frames.

2. The transmission device according to claim 1,
wherein the identification code of the transmission device is used to measure path delay time for a predetermined transmission path by using the delay measurement information, and
wherein the detection circuit detects the delay measurement information if the identification code included in the detected delay measurement information is the identification code of the transmission device.

3. The transmission device according to claim 2, further comprising:
a competition control circuit configured to control timings at which the delay measurement information generated and the delay measurement information detected are inserted, respectively, if the identification code is an identification code of the counterpart device.

4. The transmission device according to claim 3,
wherein the measurement competition flag indicates whether or not measurements of the path delay time by the transmission device and the counterpart device are competing in the transmission device, and
wherein if a point of time when the identification code is detected is later than a point of time when the identification code is generated, the competition control circuit sets the measurement competition flag included in the detected delay measurement information, and inserts the delay measurement information, which includes the set measurement competition flag.

5. The transmission device according to claim 4,
wherein, if the identification code included in the detected delay measurement information is the identification code of the transmission device and the measurement competition flag included in the detected delay measurement information is not set, the detection circuit is further configured to specify that the path delay measurement for the transmission path is successful.

6. The transmission device according to claim 4,
wherein, if the identification code included in the detected delay measurement information is the identification code of the transmission device and the measurement competition flag included in the detected delay measurement information is set, the code generation circuit is further configured to generate again the delay measurement information.

7. The transmission device according to claim 4, further comprising:
a timing control circuit configured to count the number of times by which the detected measurement competition flag is set, when the identification code included in the detected delay measurement information is the identification code of the transmission device and the measurement competition flag included in the detected delay measurement information is set.

8. The transmission device according to claim 7,
wherein, if the number of times exceeds a predetermined number, the timing control circuit delays the timing at which the delay measurement information is generated by a predetermined time.

9. A transmission network system comprising:
a first transmission device configured to generate delay measurement information, to insert the generated delay measurement information, in a plurality of frames, the delay measurement information being inserted in the plurality of frames such that a first portion of the delay measurement information is inserted in a first frame of the plurality of frames and a second portion of the delay measurement information that is distinct from the first portion is inserted in a second frame of the plurality of frames, and to transmit the plurality of frames inserted with the delay measurement information on a transmission path to be measured; and
a second transmission device configured to receive the plurality of frames transmitted from the first transmission device, to detect the delay measurement information included in the plurality of received frames, to insert the detected delay measurement information, in the plurality of frames, the delay measurement information being inserted in the plurality of frames such that a portion of the delay measurement information is inserted in at least two of the plurality of frames, and to transmit the plurality of frames sequentially inserted with the delay measurement information to the first transmission device,
wherein the first transmission device receives the plurality of frames transmitted from the second transmission device and detects the delay measurement information from the plurality of received frames, and
wherein the first transmission device and the second transmission device oppose to each other on the transmission path to be measured.

10. The transmission network system according to claim 9,
wherein the delay measurement information includes an identification code of a transmission device to measure path delay time for a predetermined transmission path by using the delay measurement information, and wherein the first transmission device detects the delay measurement information transmitted by the first transmission device if the identification code included in the detected delay measurement information by the first transmission device is an identification code of the first transmission device.

11. The transmission network system according to claim 10, wherein, if the identification code detected by the second transmission device is the identification code of the first transmission device, the second transmission device controls timings at which the delay measurement information generated by the second transmission device and the delay measurement information detected by the second transmission device are inserted, respectively.

12. The transmission network system according to claim 11, wherein the delay measurement information includes a measurement competition flag indicating whether or not measurements of the path delay time by the first transmission device and the second transmission device are competing in the first or second transmission device, and wherein, if a point of time when the identification code is detected by the second transmission device is later than a point of time when the identification code is generated by the second transmission device, the second transmission device sets the measurement competition flag included in the detected delay measurement information and inserts the detected delay measurement information, which includes the set measurement competition flag.

13. A path delay measuring method, comprising:

generating delay measurement information the delay measurement information including a measurement start flag, an identification code of the transmission device, and a measurement competition flag;

inserting the generated delay measurement information, in a plurality of frames, the delay measurement information being inserted in the plurality of frames such that a first portion of the delay measurement information is inserted in a first frame of the plurality of frames and a second portion of the delay measurement information that is distinct from the first portion is inserted in a second frame of the plurality of frames;

transmitting the plurality of frames inserted with the delay measurement information to a counterpart device on a transmission path whose path delay time is to be measured;

receiving the plurality of frames transmitted from the counterpart device; and detecting the delay measurement information included in the plurality of received frames.

14. The path delay measuring method according to claim 13, wherein the identification code of the transmission device is used to measure path delay time for a predetermined transmission path by using the delay measurement information, and the path delay measuring method further comprises:

detecting the transmitted delay measurement information if the identification code included in the detected delay measurement information is the identification code of the transmission device.

15. The path delay measuring method according to claim 14, further comprising:

controlling timings at which the generated delay measurement information and the detected delay measurement information are inserted, respectively, if the detected identification code is an identification code of the counterpart device.

16. The path delay measuring method according to claim 15, wherein the measurement competition flag indicates whether or not measurements of the path delay time by the transmission device and the counterpart device are competing in the transmission device, and the path delay measuring method further comprises:

if a point of time when the identification code is detected is later than a point of time when the identification code is generated, setting the measurement competition flag included in the detected delay measurement information; and inserting the detected delay measurement information including the set measurement competition flag.

17. The path delay measuring method according to claim 16, further comprising:

if the identification code included in the detected delay measurement information is the identification code of the transmission device and the measurement competition flag included in the detected delay measurement information is not set, specifying that the path delay measurement for the transmission path is successful.

18. The path delay measuring method according to claim 16, further comprising:

if the identification code included in the detected delay measurement information is the identification code of the transmission device and the measurement competition flag included in the detected delay measurement information is set, generating again the delay measurement information.

19. The path delay measuring method according to claim 16, further comprising:

counting the number of times by which the detected measurement competition flag is set, when the identification code included in the detected delay measurement information is the identification code of the transmission device and the measurement competition flag included in the detected delay measurement information is set.

20. The path delay measuring method according to claim 19, further comprising:

if the number of times exceeds a predetermined number, delaying the timing at which the delay measurement information is generated, by a predetermined time.

* * * * *